(12) United States Patent
Shigeta et al.

(10) Patent No.: US 8,704,771 B2
(45) Date of Patent: Apr. 22, 2014

(54) PORTABLE ELECTRONIC APPARATUS AND CONTROL METHOD THEREOF

(75) Inventors: Saya Shigeta, Yokohama (JP); Taro Iio, Yokohama (JP)

(73) Assignee: Kyocera Corporation, Kyoto (JP)

( * ) Notice: Subject to any disclaimer, the term of this patent is extended or adjusted under 35 U.S.C. 154(b) by 857 days.

(21) Appl. No.: 12/377,988

(22) PCT Filed: Jul. 26, 2007

(86) PCT No.: PCT/JP2007/064707
§ 371 (c)(1),
(2), (4) Date: Oct. 15, 2009

(87) PCT Pub. No.: WO2008/020538
PCT Pub. Date: Feb. 21, 2008

(65) Prior Publication Data
US 2010/0164871 A1  Jul. 1, 2010

(30) Foreign Application Priority Data

Aug. 18, 2006 (JP) .................................. 2006-223381
Aug. 25, 2006 (JP) .................................. 2006-229511

(51) Int. Cl.
*G06F 3/02* (2006.01)

(52) U.S. Cl.
USPC ............................. 345/169; 345/173; 200/18

(58) Field of Classification Search
CPC . G06F 3/0338; G06F 3/03547; G06F 3/0482; G06F 2203/0339; H04M 1/23; H04M 2250/16
USPC .................... 345/169–183; 178/18.01–19.15; 200/600, 181, 19.01–19.07; 324/658; 320/166; 341/33; 361/287; 400/473.1
See application file for complete search history.

(56) References Cited

U.S. PATENT DOCUMENTS 6,504,530 B1 * 1/2003 Wilson et al. .................. 345/173
7,825,797 B2 * 11/2010 Zawde et al. ............. 340/539.23

(Continued)

FOREIGN PATENT DOCUMENTS

JP  06111695 A  4/1994
JP  11194863 A  7/1999

(Continued)

OTHER PUBLICATIONS

Japanese language office action dated Jul. 16, 2013 and its English language Statement of Relevance of Non-English Language References Pursuant to 37 CFR 1398(a)(3)(i) issued in corresponding Japanese application 2006229511.

(Continued)

*Primary Examiner* — Amare Mengistu
*Assistant Examiner* — Vinh Lam
(74) *Attorney, Agent, or Firm* — DLA Piper LLP (US)

(57) ABSTRACT

Portable electronic apparatus includes a display unit (ELD); a first sensor element group (G1) having a plurality of sensor elements (L1-L4) for detecting a contact and arranged continuously around the display unit side by side; a switch element formed where the first sensor element group is arranged; and a control unit for controlling the portable electronic apparatus to display a plurality of selection candidate items which can be displayed as an operation target region on the display unit, to monitor a change in a detection state of the first sensor element group and a state of the switch element, to change a selection state of a selection candidate item by changing the selection candidate items and/or the operation target region based on the change in the detection state of the first sensor element group, and to execute a selection candidate item in the selection state when the switch element is pressed.

7 Claims, 28 Drawing Sheets

(56) References Cited

U.S. PATENT DOCUMENTS

| | | | |
|---|---|---|---|
| 7,831,932 B2* | 11/2010 | Josephsoon et al. | 715/863 |
| 2002/0030666 A1* | 3/2002 | Philipp | 345/168 |
| 2003/0006892 A1* | 1/2003 | Church | 340/439 |
| 2003/0080755 A1* | 5/2003 | Kobayashi | 324/658 |
| 2003/0094354 A1* | 5/2003 | Badarneh | 200/18 |
| 2004/0012572 A1* | 1/2004 | Sowden et al. | 345/173 |
| 2004/0203513 A1* | 10/2004 | Kwon | 455/90.3 |
| 2004/0233159 A1* | 11/2004 | Badarneh | 345/156 |
| 2005/0012723 A1* | 1/2005 | Pallakoff | 345/173 |
| 2005/0052425 A1* | 3/2005 | Zadesky et al. | 345/173 |
| 2005/0140661 A1* | 6/2005 | Collins | 345/173 |
| 2005/0168441 A1* | 8/2005 | Obitsu et al. | 345/157 |
| 2005/0179668 A1* | 8/2005 | Edwards | 345/173 |
| 2005/0195164 A1* | 9/2005 | Sato | 345/157 |
| 2006/0017711 A1* | 1/2006 | Pihlaja | 345/173 |
| 2006/0097990 A1* | 5/2006 | Izumi | 345/173 |
| 2006/0238517 A1* | 10/2006 | King et al. | 345/173 |
| 2007/0075976 A1* | 4/2007 | Kun et al. | 345/172 |
| 2007/0165006 A1* | 7/2007 | Sato et al. | 345/174 |
| 2008/0036595 A1* | 2/2008 | Hollstien et al. | 340/541 |

FOREIGN PATENT DOCUMENTS

| | | |
|---|---|---|
| JP | 2003-280792 | 10/2003 |
| JP | 2004-311196 | 11/2004 |
| JP | 2004-355606 | 12/2004 |
| JP | 2005122271 A | 5/2005 |
| JP | 2005-522797 | 7/2005 |
| WO | WO 03/088176 A1 | 10/2003 |

OTHER PUBLICATIONS

Japanese language office action dated Mar. 13, 2012 and its English language translation issued in corresponding Japanese application 2006229511.

Japanese language office action dated Mar. 8, 2011 and its English language translation issued in corresponding Japanese application 2006229511.

Japanese language office action dated Aug. 24, 2010 and its English language translation issued in corresponding Japanese application 2006229511.

Japanese language office action and its English language translation for corresponding Japanese application 2006-229511.

* cited by examiner

FIG. 6
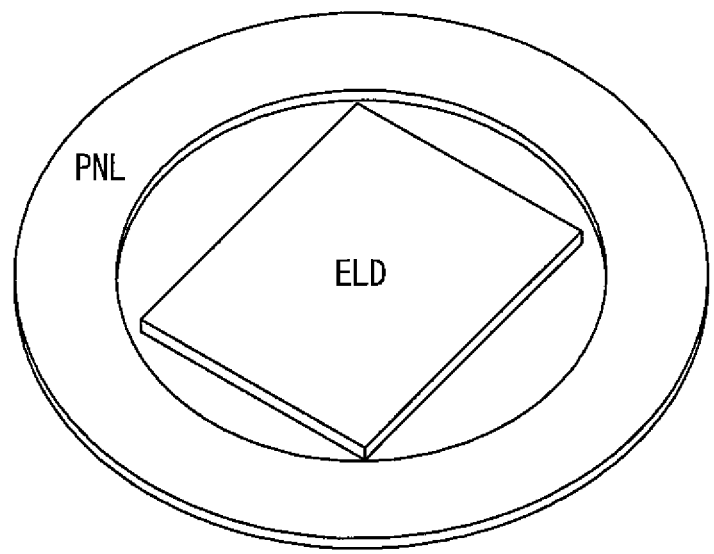
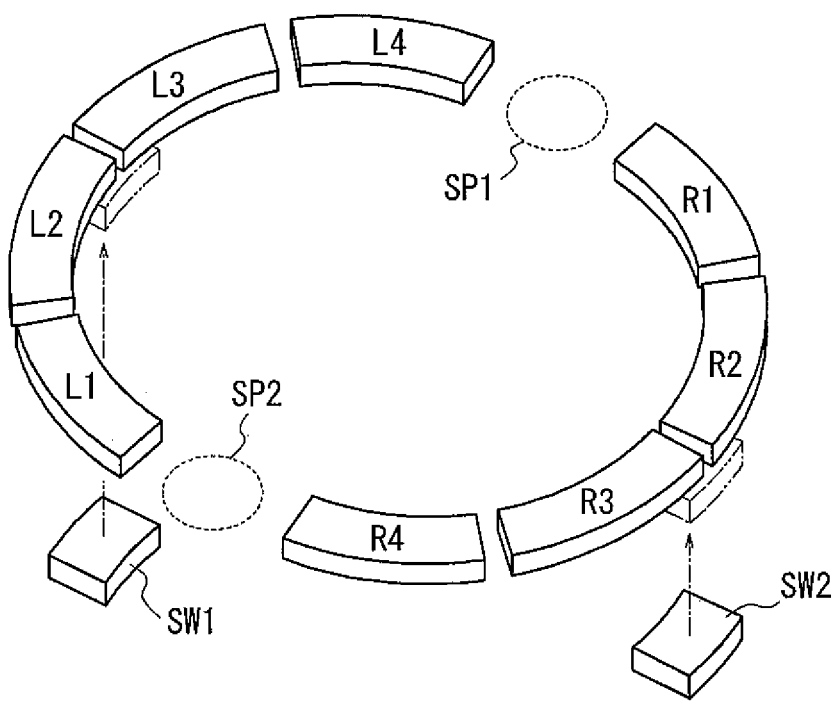

FIG. 8
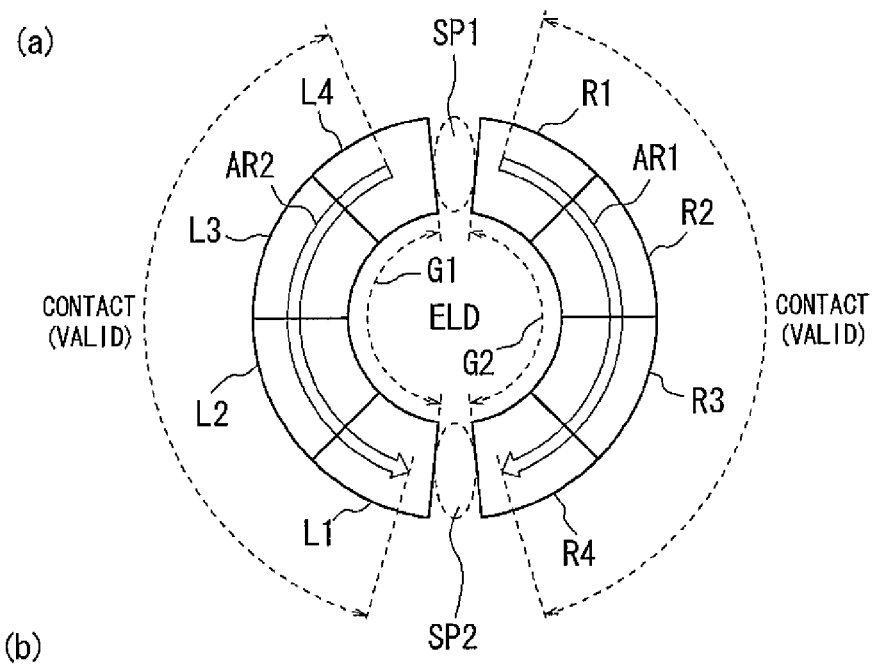
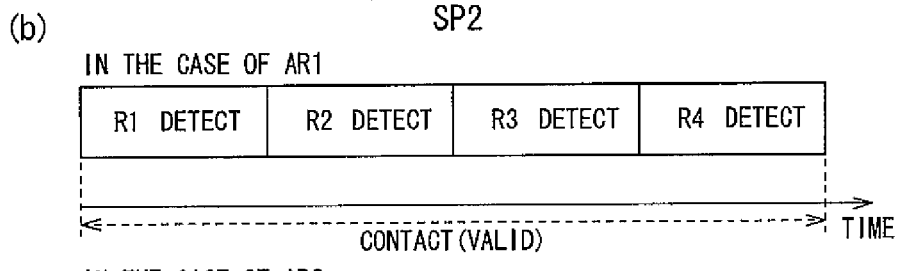
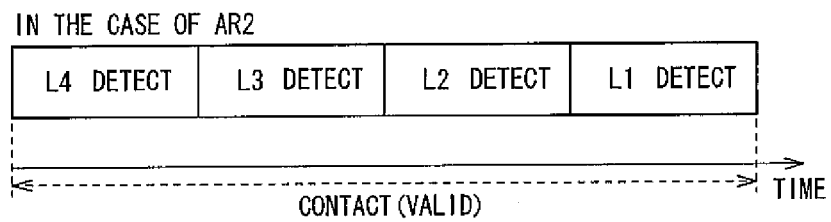
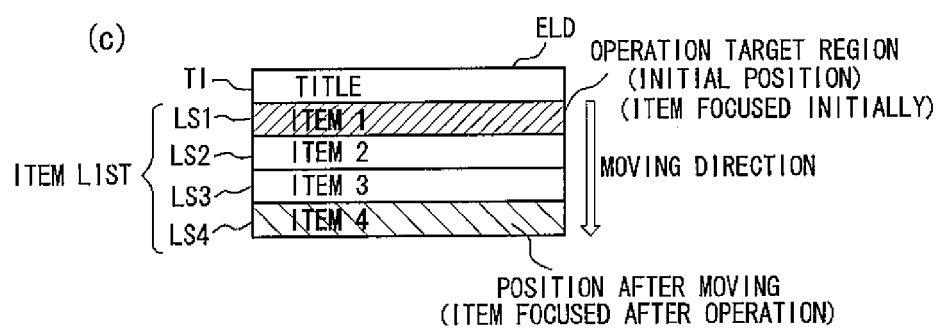

FIG. 10
(a)
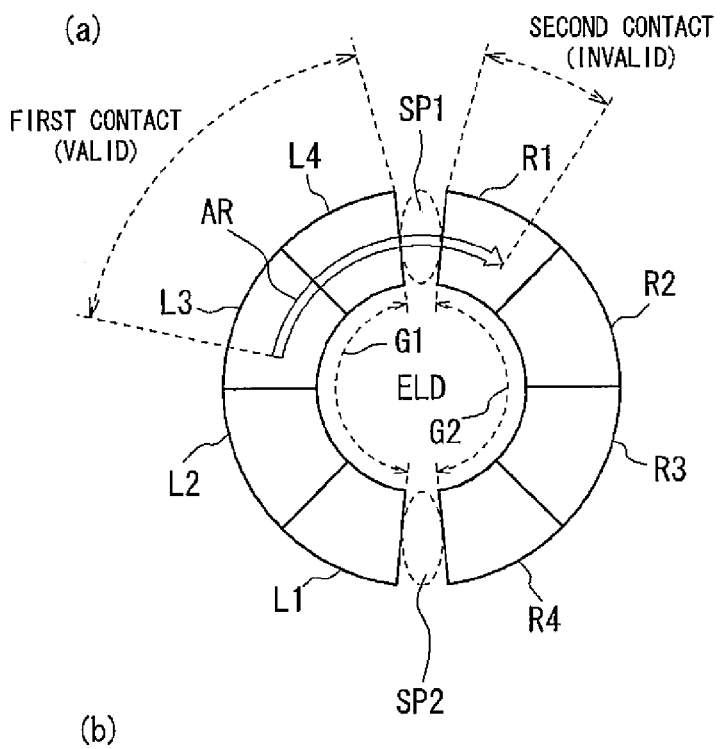
(b)
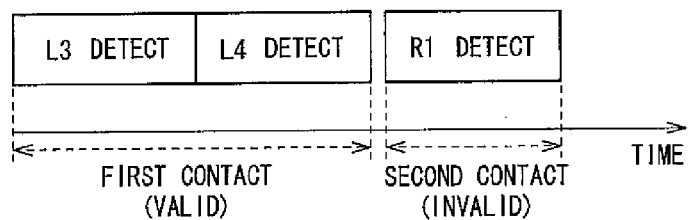
(c)
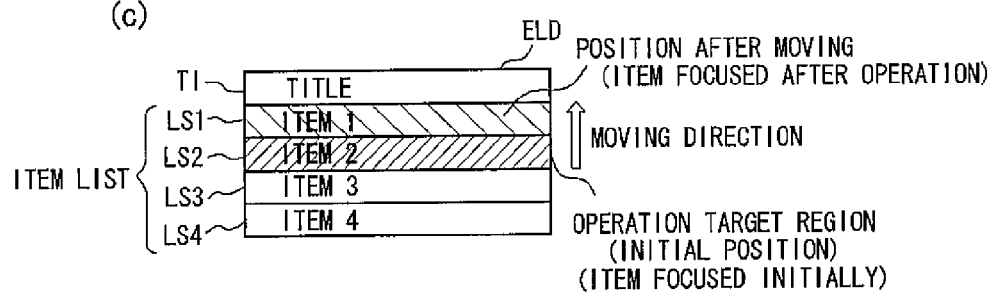

FIG. 14
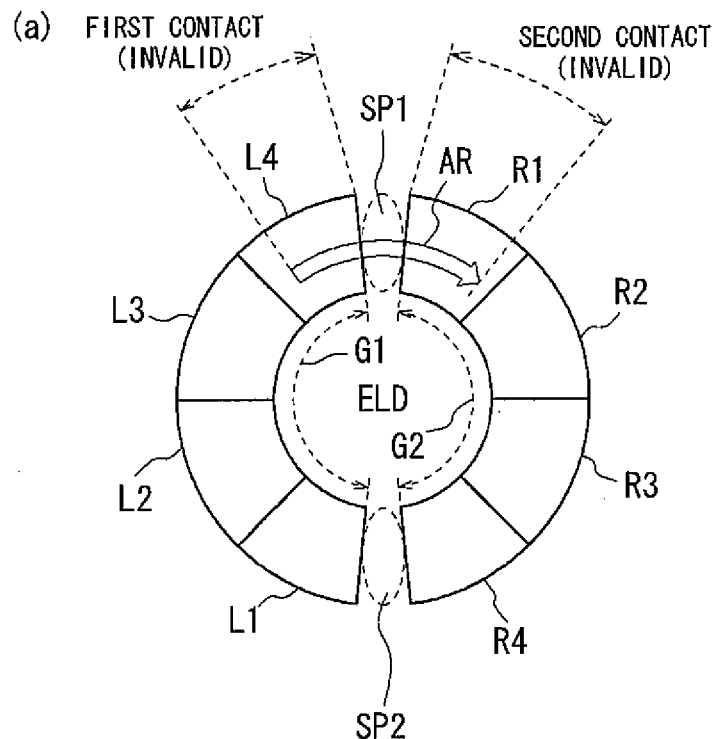
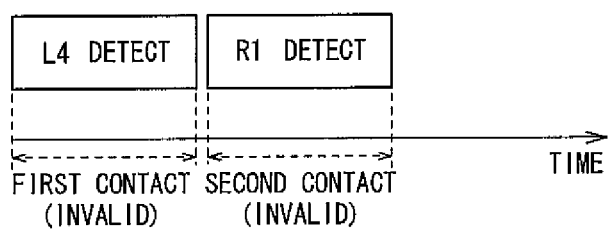
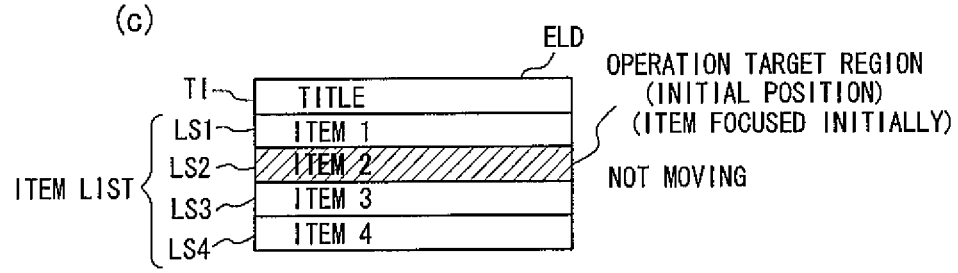

FIG. 15
(a)
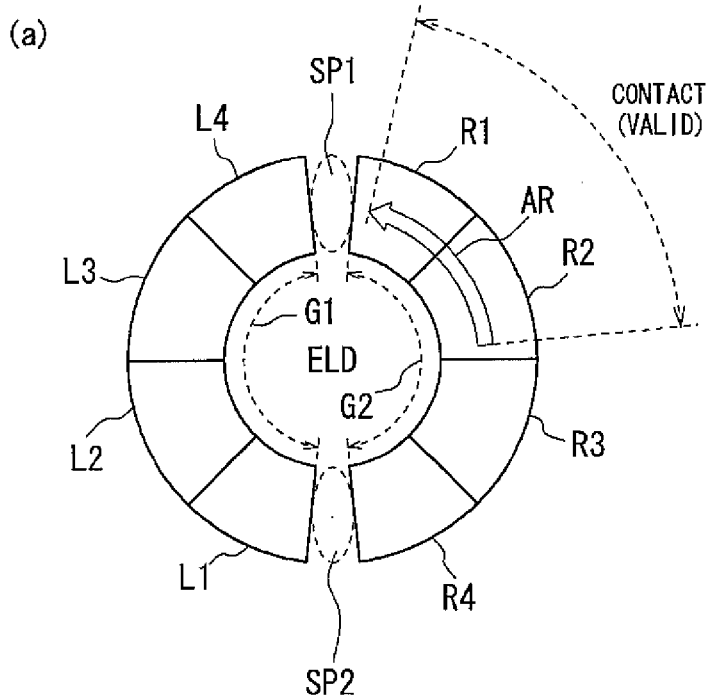
(b)
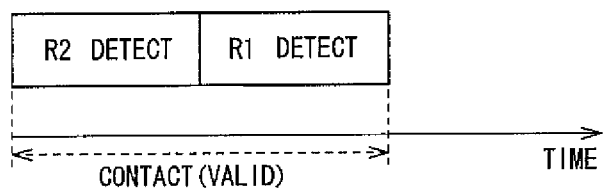
(c)
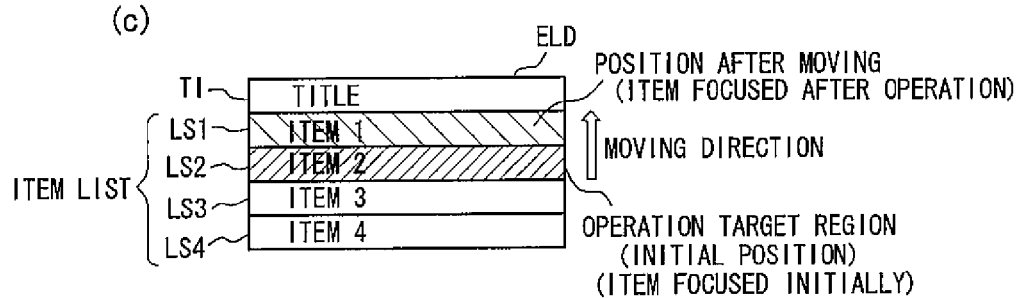

FIG. 16
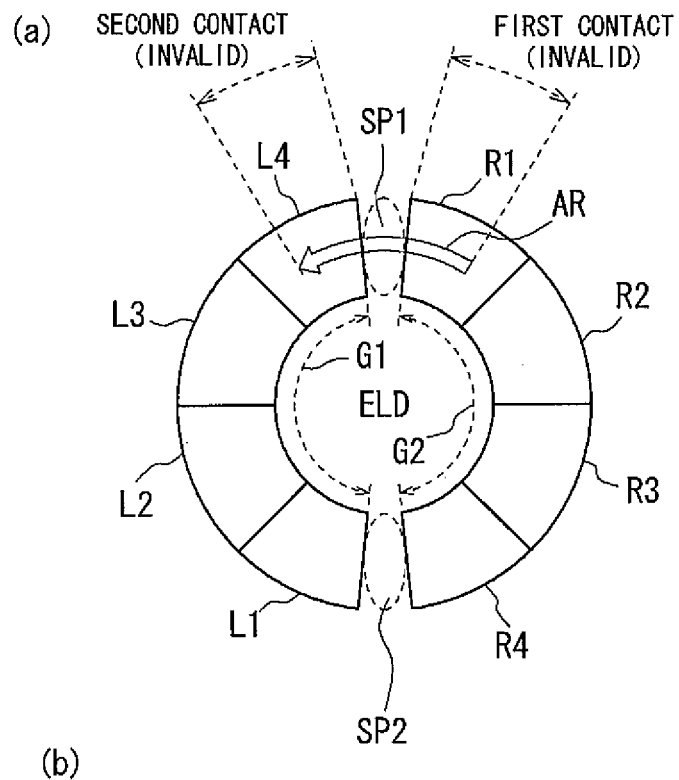
(a)
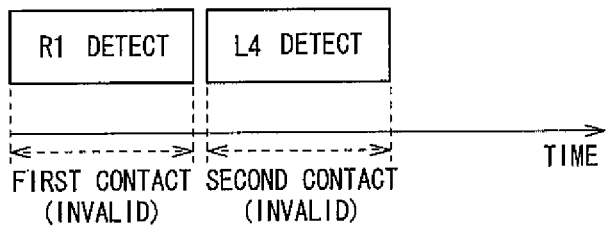
(b)
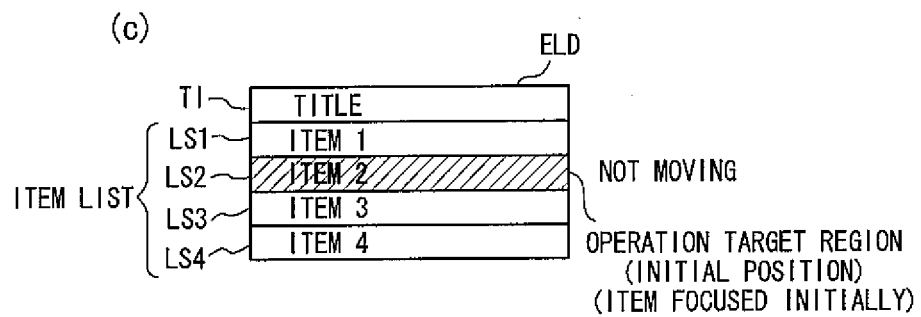
(c)

FIG. 17
(a) 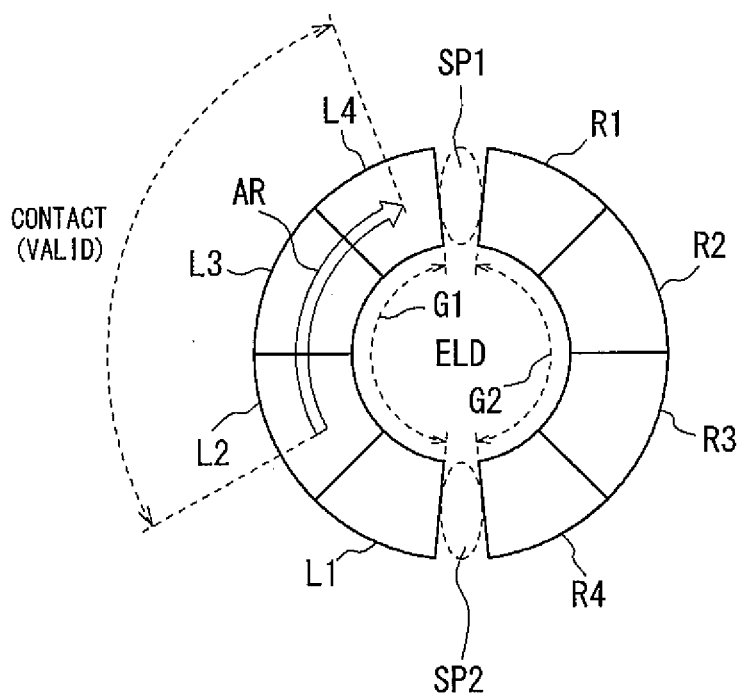
(b) 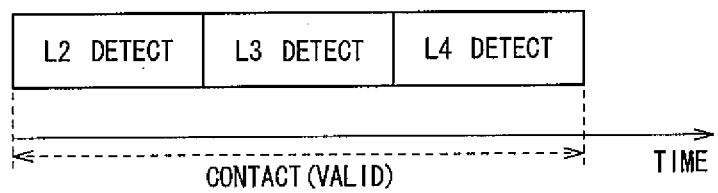
(c) 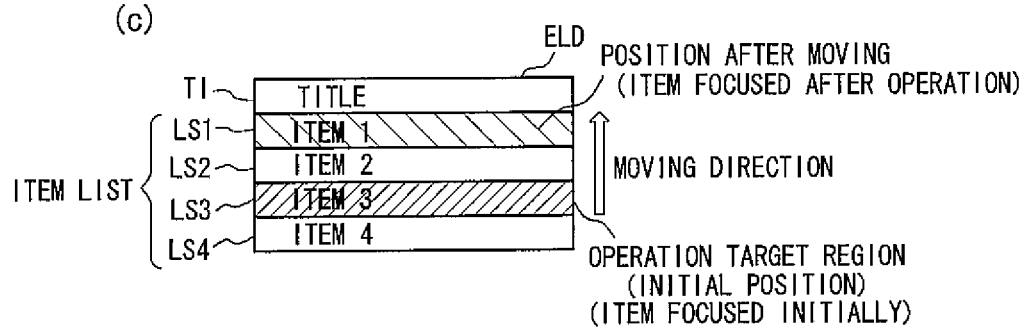

FIG. 18
(a)
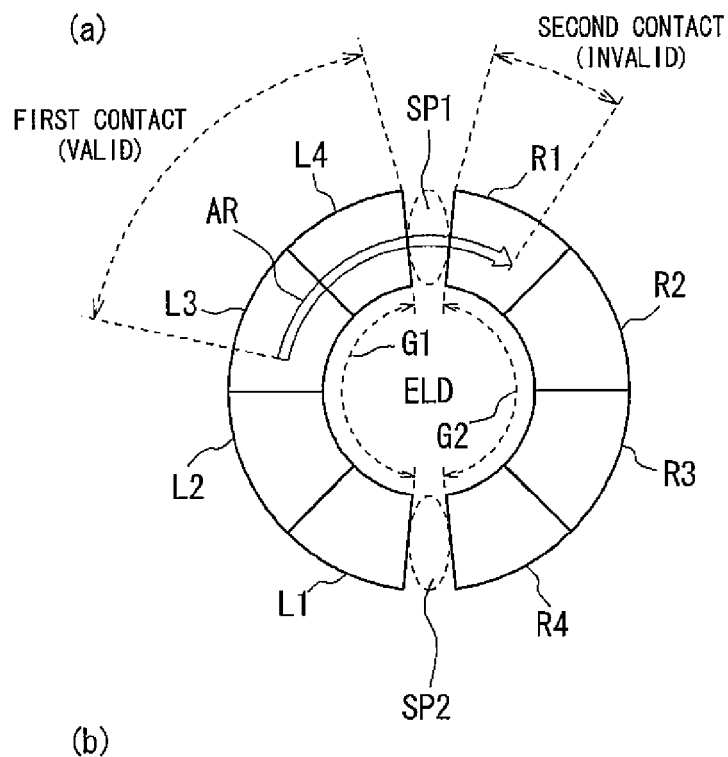
(b)
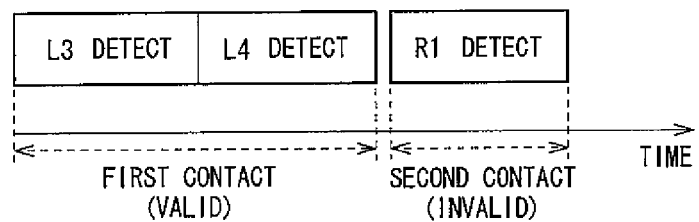
(c)
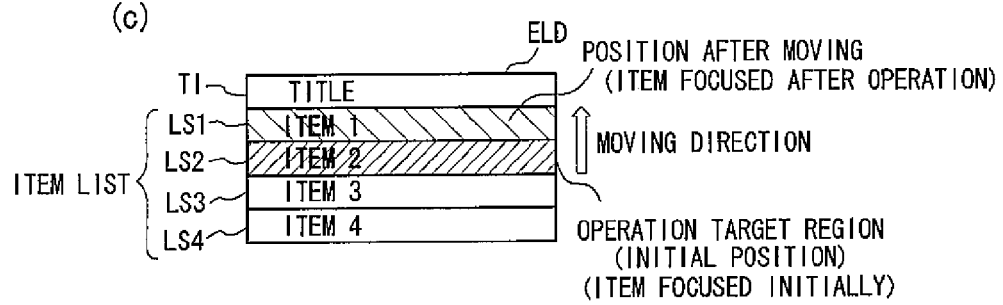

FIG. 19
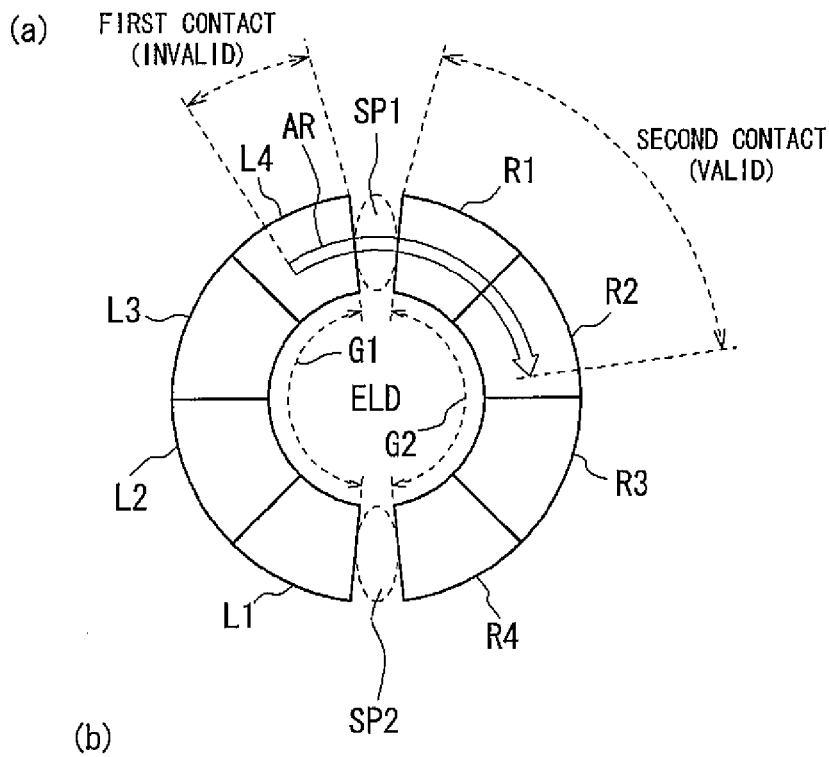
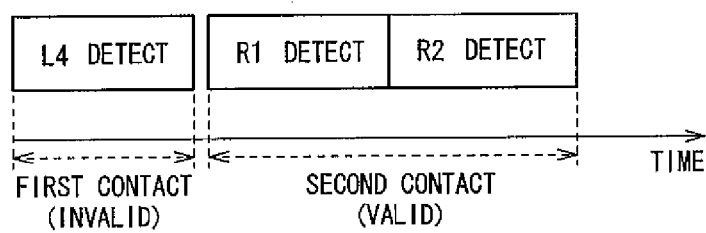
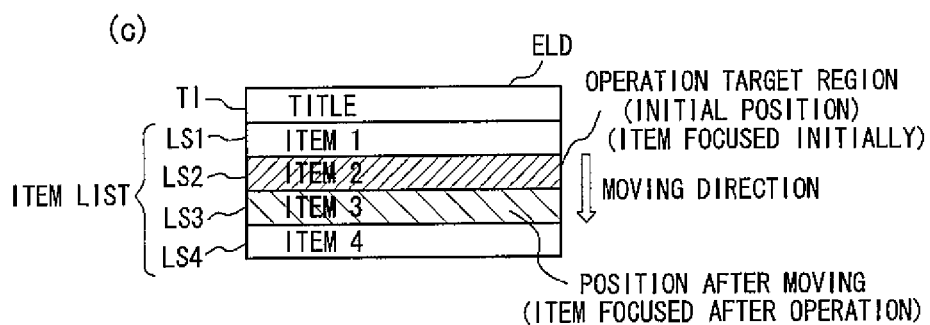

FIG. 20
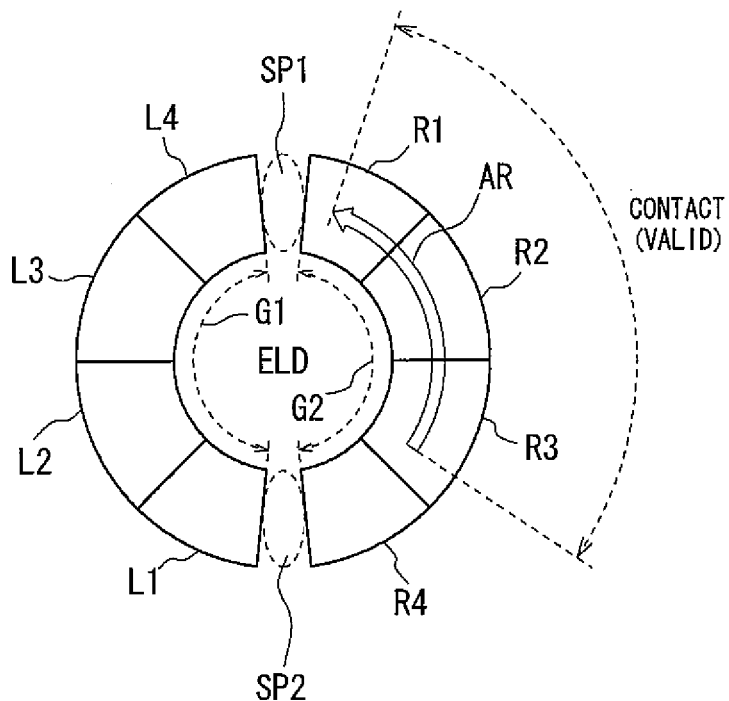
(a)
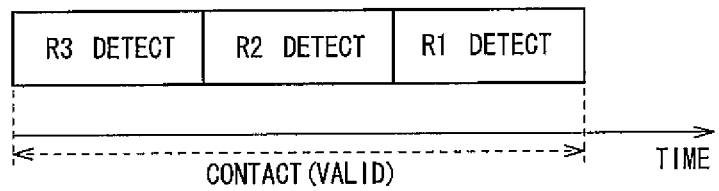
(b)
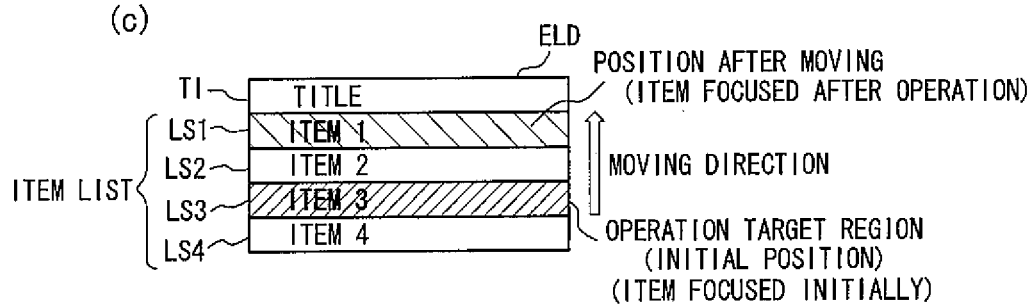
(c)

FIG. 21
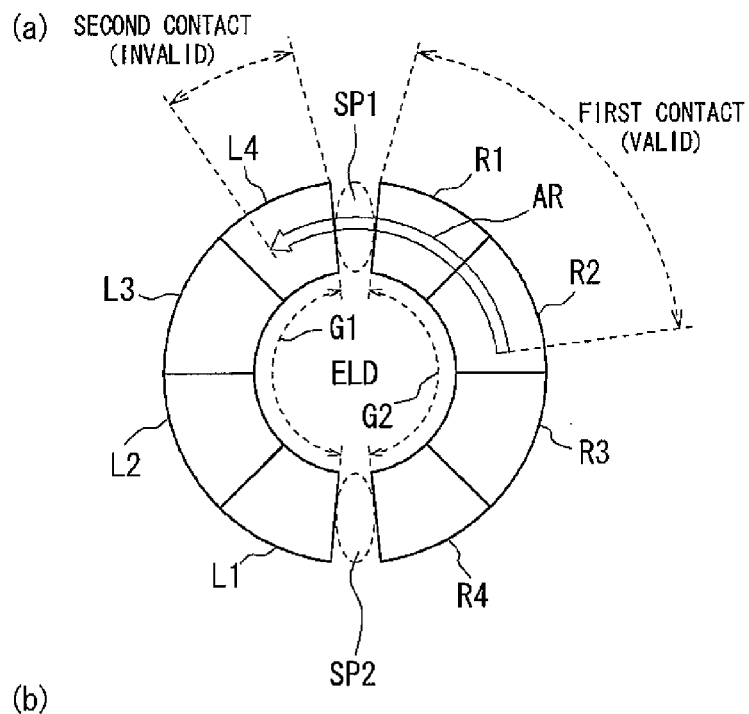
(a)
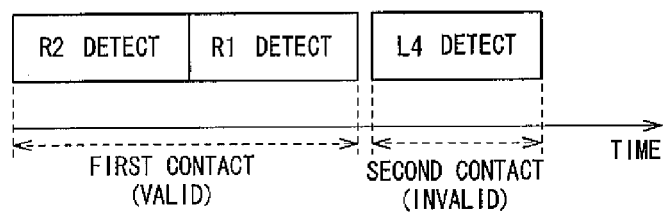
(b)
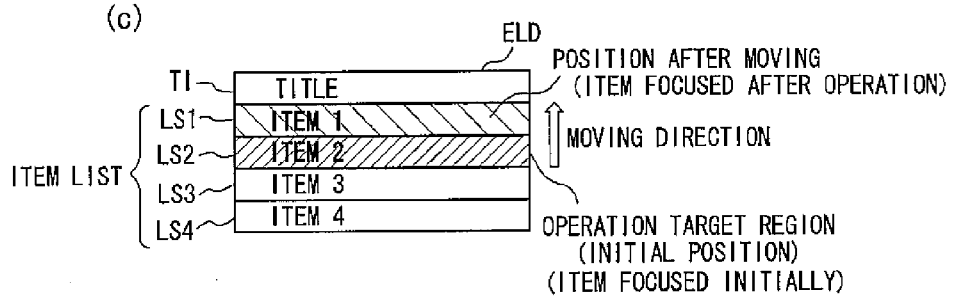
(c)

FIG. 22
(a)
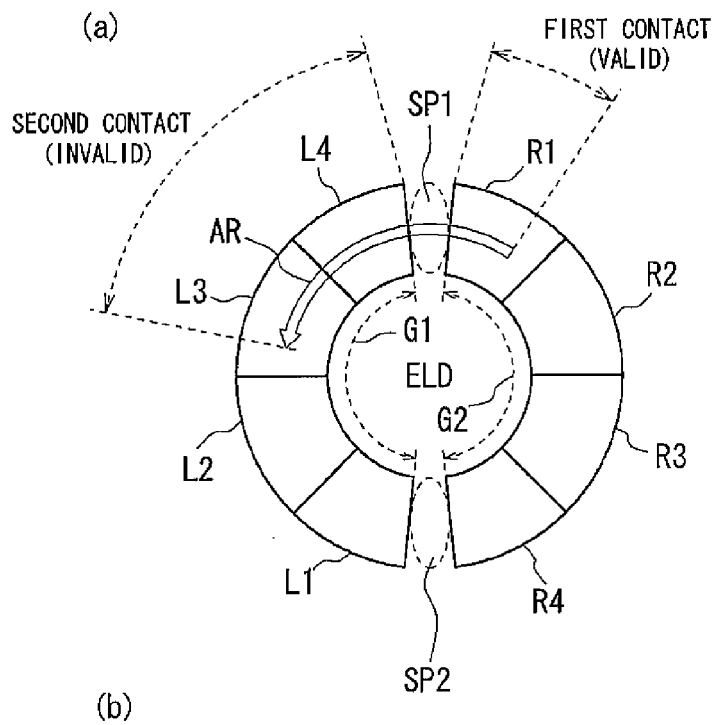
(b)
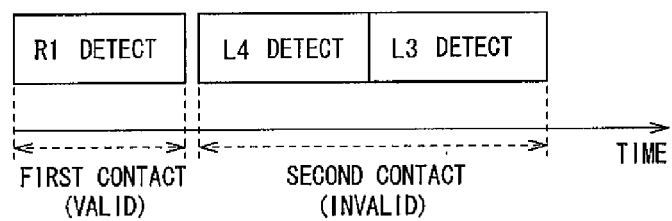
(c)
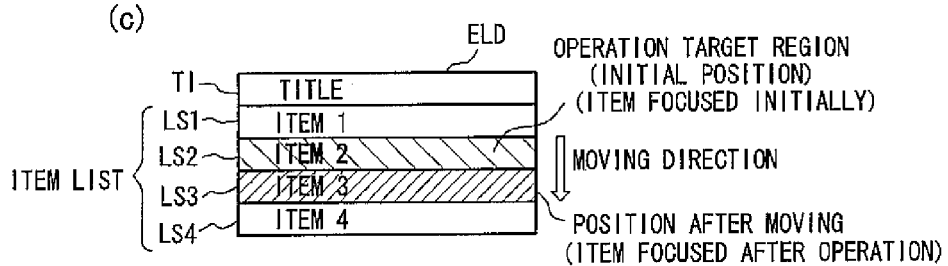

FIG. 23
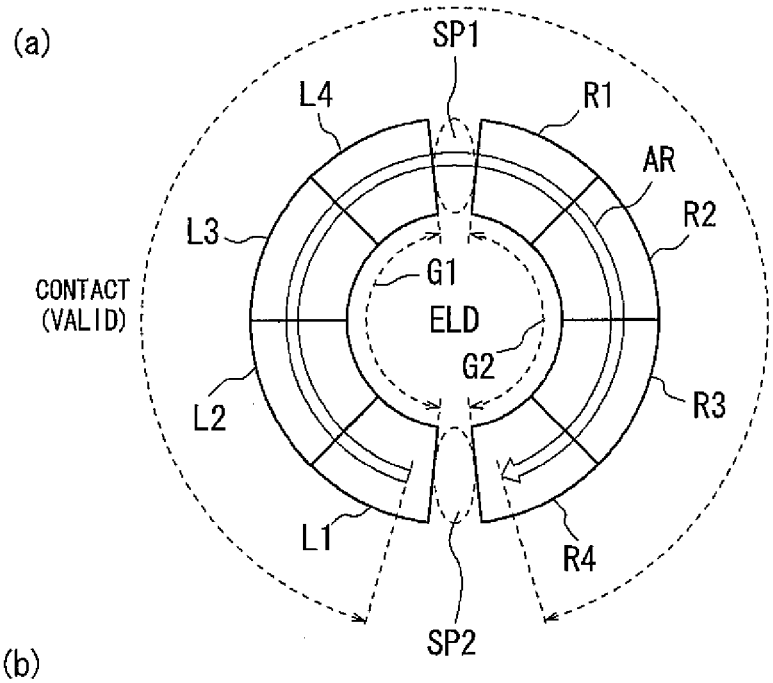
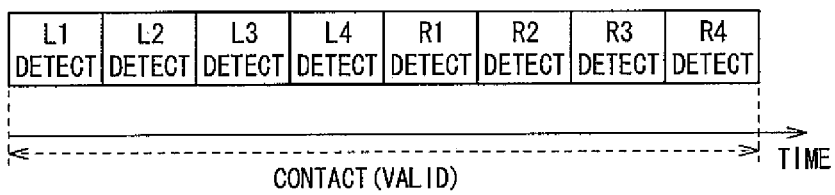
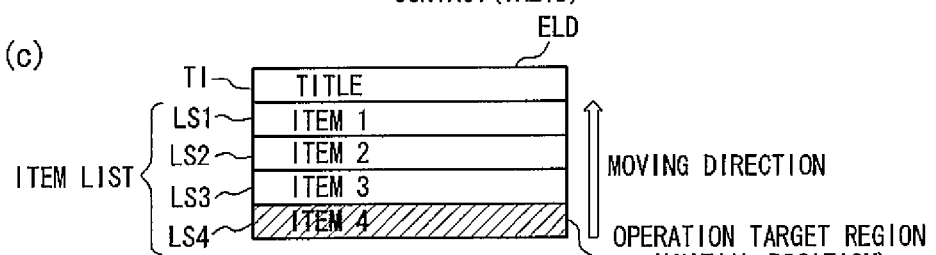
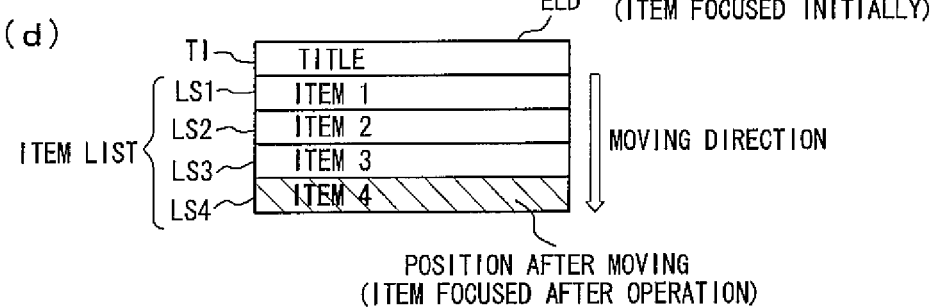

FIG. 24
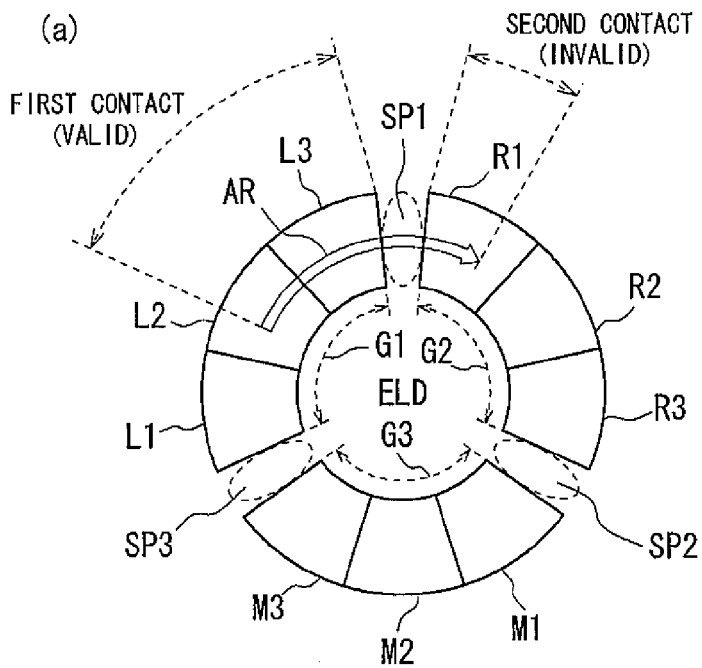
(a)
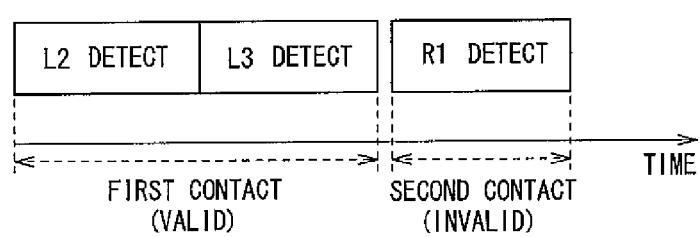
(b)
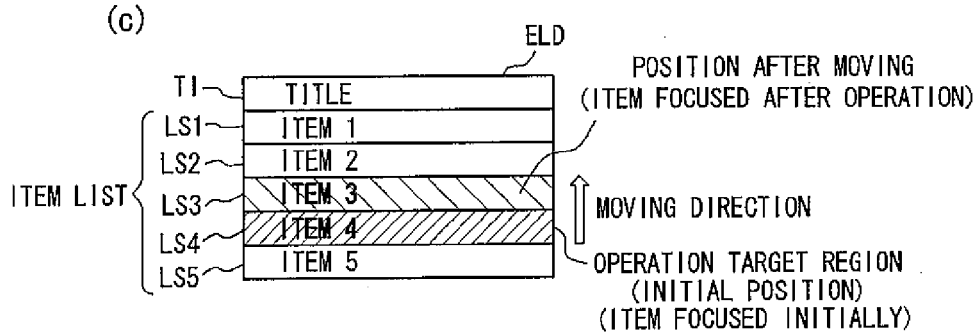
(c)

FIG. 25
(a)
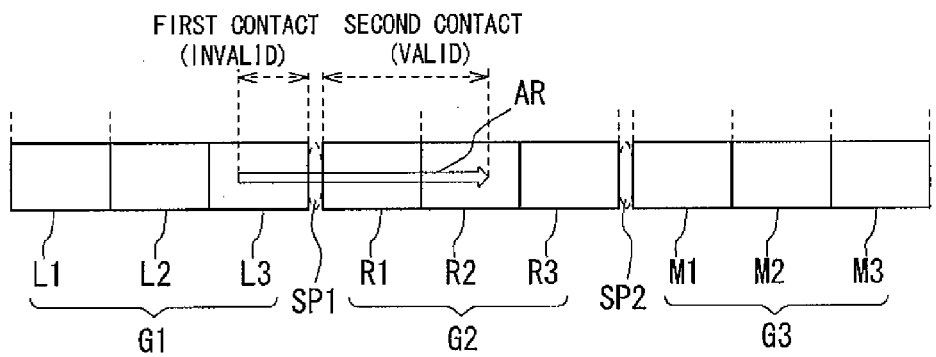
(b)
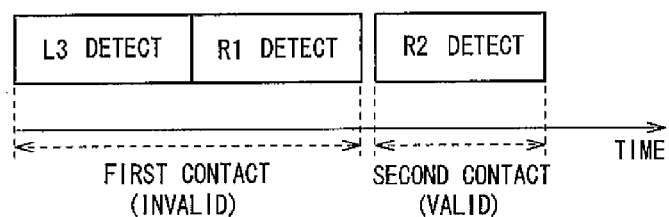
(c)
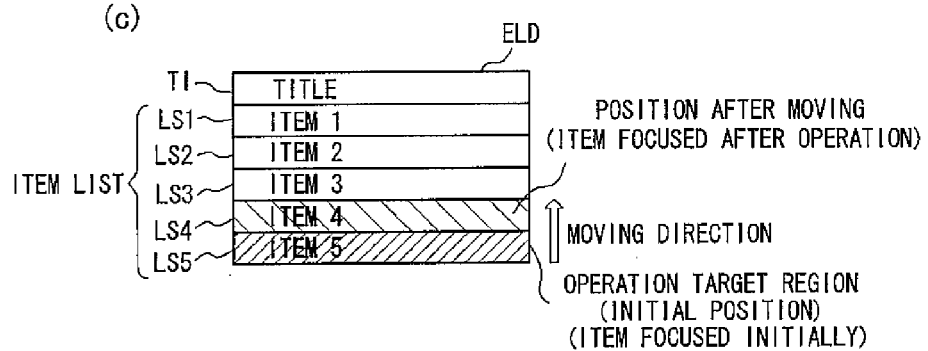

FIG. 27
(a)
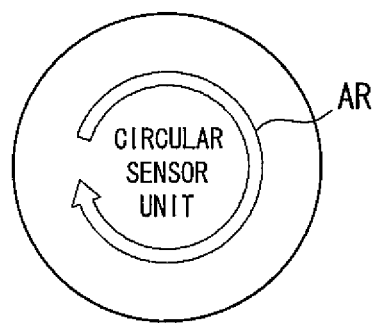
(b)
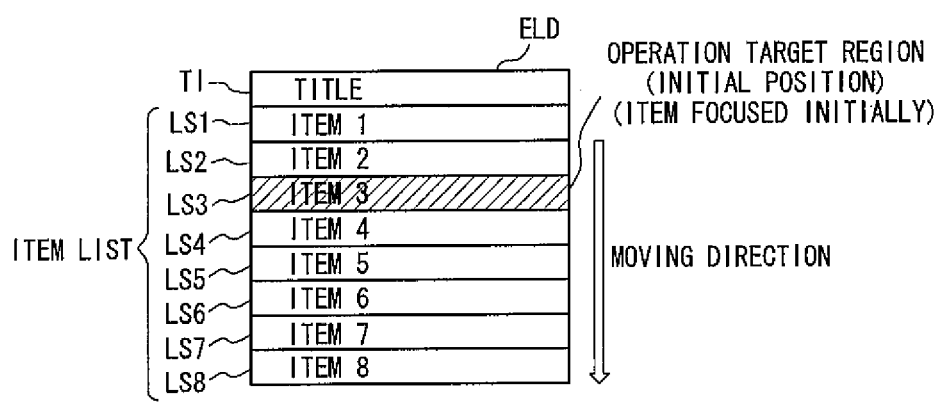

FIG. 28
(a)
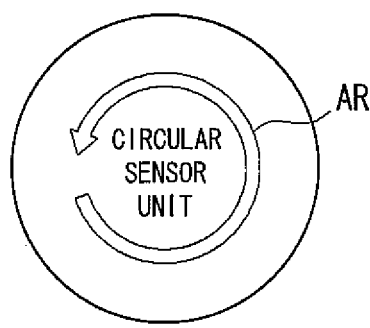
(b)
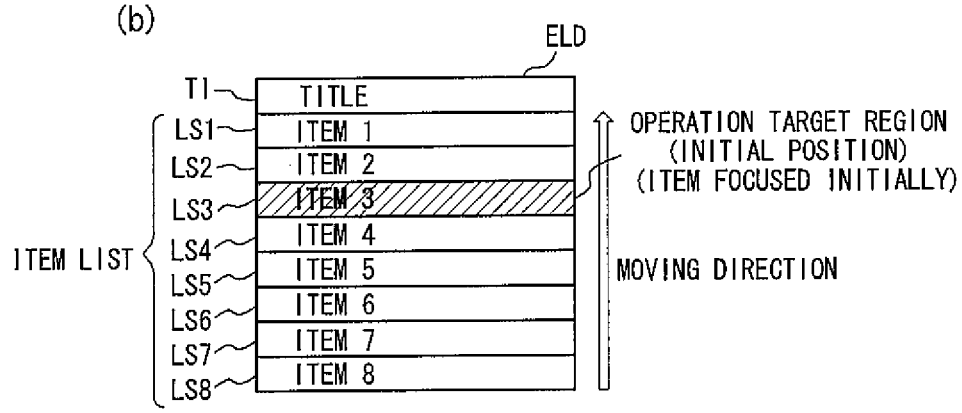

PORTABLE ELECTRONIC APPARATUS AND CONTROL METHOD THEREOF

CROSS REFERENCE TO RELATED APPLICATION

This application is a national stage of international application No. PCT/JP2007/064707 filed on Jul. 26, 2007, which also claims priority to and the benefit of Japanese Patent Application No. 2006-223381 filed Aug. 18, 2006 and Japanese Patent Application No. 2006-229511 filed Aug. 25, 2006, the entire content of which are incorporated herein by reference.

TECHNICAL FIELD

The present invention relates to a portable electronic apparatus, more specifically, to a portable electronic apparatus having a plurality of sensors annularly arranged for detecting contact as an operation input unit and a control method thereof.

BACKGROUND ART

Various interfaces and designs have been developed for an operation input unit of a portable electronic apparatus. For example, there is a technique which provides a rotary dial input device to a portable electronic apparatus and moves a cursor displayed on a display unit according to the rotation amount of the rotary dial input device (see Japanese Patent Application Laid Open No. 2003-280792). However, since the conventional technique employs "rotary dial" rotated physically and mechanically, there are troubles or errors caused by mechanical abrasion. Therefore, maintenance of the operation input unit is necessary, and the durable period is short.

In order to solve above problems, techniques employing touch sensor elements, which are not operated by physical and mechanical rotations, in an operation unit have been suggested (see Japanese Patent Application Laid Open Nos. 2005-522797 and 2004-311196). These techniques arrange a plurality of touch sensors annularly to detect a contact, monitor contact detections by touch sensor elements, and when continuous contact detections are detected, it determine there is a movement instruction of a display position according to the movement of contact detection points.

DISCLOSURE OF THE INVENTION

Problems to be Solved by the Invention

FIGS. 27 and 28 show conventional sensor elements and control methods thereof. As shown in FIGS. 27 and 28, there is an "movement rule" defined previously, such as scrolling downward an operation target region (a region indicated by a cursor, an emphasized display region, etc., like the LS3 being hatched) for indicating which one is selected among items LS1~LS8 on a display unit as shown in the FIG. 27(b) when a user traces sensor elements, which detect a contact and is arranged annularly, clockwise as indicated by an arrow AR in FIG. 27(a); and scrolling upward the operation target to region as shown in the FIG. 28(b) when the user traces counterclockwise as indicated by an arrow AR in FIG. 28(a). However, in this "movement rule", when a user traces sensor elements arranged annularly from lower left to "top" in the clockwise direction with a finger, for example, the operation target region LS3 in items LS1~LS8 on the display unit is "scrolled downward". Therefore, the scroll direction of an item on the display unit does not correspond to the moving direction of user's finger, so that a user is likely to feel a sense of incongruity. While a user usually expects a display item to move in a moving direction of his finger by instinct, in this technique, the item moves in an opposite direction contrary to his expectation, which puts a user under stress. In other words, since the physical movement (circular movement) of user's finger for instructing a movement and a scroll operation of a display item (upward and downward direction, leftward and rightward direction) do not correspond each other, a user is difficult to recognize a scroll direction without seeing the screen actually with moving a finger. It is a problem in a sensor element type device as well as the rotary dial type that the physical movement (circular movement) of user's finger for instructing a movement and a scroll operation of a display item (upward and downward direction, leftward and rightward direction) do not correspond each other. Therefore, the convention sensor, regardless of the rotary dial type and sensor element type, is not sufficient for a user interface to move a selection item by an instinct operation of a user.

When a user decides to select an item after moving the item on a display unit by operating a touch sensor, it is necessary to further form a decision input unit (key, tact switch, or the like) for instructing the decision. However, there is a problem that a portable electronic apparatus is small in size and a mounting area of an outer face of housing is limited. Moreover, mounting the decision input unit on the outer face reduces design quality.

Further, when sensor elements and a display unit are required to be mounted on an area of the outer face of a small portable electronic apparatus having a small area of the outer face without damaging operability and design quality, sensor elements should be small. Thus, a user may not touch a sensor element where he intends correctly, and therefore, a cursor or an operating target region displayed on the display unit may be moved in a wrong direction. For example, if a user's finger that instructs a movement on sensor element goes over even a little and touches another sensor element, which becomes an instruction operation that he does not intend, the display unit operates differently form user's intention. This may be also a factor to put a user under stress, and especially to affect the user strongly when he is not familiar with the portable electronic apparatus. Accordingly, a technique for avoiding or invalidating an erroneous contact of a sensor element cased by carelessness or unfamiliarity of a user with corresponding to operations of user's finger faithfully is required.

It is an advantage of the present invention to provide a portable electronic apparatus having comfortable operability and usability by solving the problems described above and a control method thereof. Moreover, it is another advantage of the present invention to provide a portable electronic apparatus capable of preventing an erroneous operation caused by an operation that a user does not intend (i.e., wrong instruction operation) with corresponding instruction operations by a user, and having comfortable and instinct operability and usability without making a user feel troublesome, and a display control method thereof.

SUMMARY OF THE INVENTION

To solve the problem, according to the present invention, a portable electronic apparatus includes:

a display unit (mounted on an outer face of a housing);

a first sensor element group having a plurality of sensor elements for detecting a contact (for example, sensor elements which have detection portions, respectively, arranged on the outer face of the housing, and detect a contact or approach of an object such as a finger or the like) and arranged continuously around (i.e., to surround) the display unit side by side;

a switch element (for example, a tact switch or a toggle switch) formed where the first sensor element group is arranged; and a control unit for allowing the display unit to display a plurality of selection candidate items (for example, some scrollable lines or rows) which can be displayed as an operation target region on the display unit, for monitoring a change in a detection state of the first sensor element group and a state of the switch element, for changing a selection state of the selection candidate item by changing the selection candidate items and/or the operation target region based on the change in the detection state of the first sensor element group, and for executing a selection candidate item in the selection state when the switch element is pressed.

Preferably, when a press of the switch element is detected, the control unit controls the apparatus to decide to select the operation target region without changing the selection candidate items and/or the operation target region, and display information according to the selected item. And, the control units preferably holds a control for changing the selection candidate items and/or the operation target region until there are continuous changes in the detection state, although there is a change in the detection state of the first sensor element group. Moreover, displaying the operation target region is performed by focusing on an item or a region, for example, by disposing a cursor on the item so as to be recognized as a focused region/item (i.e., a current operation target region or current selection target region) and/or by reversed-displaying the item. Executing the selection candidate item is, for example, operating an application related to the item. When the item is a title of music or movie, the executing means playing the music or software contents or a file corresponding to the movie title.

In a portable electronic apparatus according to an embodiment of the present invention, a direction component of an arrangement of the plurality of sensor elements composing the first sensor element group comprises at least a first direction (typically, a vertical direction), and the control unit controls the display unit to display the plurality of selection candidate items in a parallel direction to the first direction (typically, display lines horizontally written), and to change the selection candidate items along the first direction according to a change in a detection state of the first sensor element group (for example, to scroll them down when the direction component is downward).

In a portable electronic apparatus according to another embodiment of the present invention, the switch element is formed around a central portion of a line (i.e., virtual line) connecting centers of the plurality of sensor elements.

In a portable electronic apparatus according to still another embodiment of the present invention, the control unit regards a press (input) of the switch element as valid when one of the selection candidate items is displayed as the operation target region (with an inversed display or the like), otherwise it regards the press of the switch element as invalid.

In a portable electronic apparatus according to still another embodiment of the present invention, when a press of the switch element is detected, and in case that only one sensor element in the plurality of sensor elements detects a contact, the control unit regards the contact detection of the sensor element as invalid.

A portable electronic apparatus according to still another embodiment of the present invention, further comprises a second sensor element group having a plurality of sensor elements arranged symmetrically to the first sensor element group (for example, to be point-symmetric with respective to the center of the display unit, or to be line-symmetric with respective to a line passing through the center), wherein the display unit is placed between them.

The second sensor element group preferably has sensor elements of the same number with the first sensor element group.

As described above, the solving means are described as an apparatus (device). However, the present invention can be implemented as a method, a program, and a recording medium for storing the program substantially corresponding to those. Therefore it will be understood that such modification and variations are considered to be within the scope of the invention.

For example, a control method of a portable electronic apparatus according to another embodiment of the present invention, in which the present invention is implemented as a method, is a control method of a portable electronic apparatus comprising a display unit, a first sensor element group having a plurality of sensor elements for detection a contact and arranged continuously around the display unit side by side, and a switch element formed where the first sensor element group is arranged, and comprises displaying a plurality of selection candidate items which can be displayed as an operation target region on the display unit;

monitoring a change in a detection state of the first sensor element group and a state of the switch element;

changing a selection state of a selection candidate item by changing the selection candidate items and/or the operation target region based on the change in the detection state of the first sensor element group; and executing a selection candidate item in the selection state when the switch element is pressed (for example, operation related to the item, and playing music or movie when the item is a title of the music or the movie).

As described above, the present invention is described with embodiments in which a switch element is provided to a portable electronic apparatus. However, a portable electronic apparatus according to the present invention may be designed without the switch element.

Specifically, a portable electronic apparatus according to an embodiment of the present invention comprises:

a first sensor element group having a plurality of sensor elements for detecting a contact and arranged continuously and adjacently;

a display unit disposed adjacent to the first sensor element group; and a control unit for controlling a display on the display unit, wherein the plurality of sensor elements of the first sensor element are arranged around the display unit in a direction comprising at least a first direction component, and the control unit controls the display unit to display a plurality of selection candidate items which can be displayed as an operation target region on the display unit in a parallel direction to the first direction, to display at least one of the plurality of selection candidate items as an operation target region (i.e., focus on at least one selection candidate item), and to change the operation target region in the plurality of selection candidate items according to a positional transition of contact detections of the plurality of sensor elements composing the first sensor element group.

In a portable electronic apparatus according to still another embodiment of the present invention, the control unit displays selection candidate items of the same number with the plurality of sensor elements composing the first sensor element group on a screen of the display unit.

In a portable electronic apparatus according to still another embodiment of the present invention, when detecting a transition from a state of a contact detection by a sensor element in the plurality of sensor elements to a state of a contact detection by an adjacent sensor element, the control unit changes the operation target region by one.

A portable electronic apparatus according to still another embodiment of the to present invention further comprises a second sensor element group composed of sensor elements of the same number with the plurality of sensor elements composing the first sensor element group.

In a portable electronic apparatus according to still another embodiment of the present invention, the second sensor element group is arranged symmetrically to the first sensor element group, and the display unit is placed between them.

In a portable electronic apparatus according to still another embodiment of the present invention, an end portion of the first sensor element group is arranged adjacent to an end portion of the second sensor element group, and the control unit detects a transition of contact detections of a plurality of sensor elements in either one of the first and the second sensor element groups, changes the operation target region displayed on the display unit in a first direction according to a positional transition of the contact detections, continuously detects a transition of contact detections of a plurality of sensor elements in another sensor element group, and changes the operation target region in an opposite direction to the first direction according to a positional transition of the contact detections.

A control method of a portable electronic apparatus according to still another embodiment of the present invention, comprises:

detecting a positional transition of contact detections of a plurality of sensor elements for detecting a contact arranged adjacent to a display unit in a direction comprising at least a first direction component; and displaying a plurality of selection candidate items which can be displayed as an operation target region and arranged in a parallel direction to the first direction on the display unit, and controlling the operation target region to be changed according to the transition detected.

EFFECT OF THE INVENTION

According to the present invention, it is possible to provide comfortable operability and usability to a user by the designs although an apparatus has a small mounting area such as a small portable electronic apparatus.

BRIEF DESCRIPTION OF THE DRAWINGS

FIG. 6 is an exploded perspective view of elements of the cellular phone terminal shown in FIG. 5;

FIG. 8 shows a response of the sub-display unit when a user traces sensor elements;

FIG. 10 shows a response of the sub-display unit when a user traces the first sensor element group G1 and the second sensor element group G2 continuously by crossing over the separating portion SP1;

FIG. 14 is a diagram explaining an operation of sensor elements according to embodiment 2 of the present invention;

FIG. 15 is a diagram explaining an operation of sensor elements according to embodiment 2 of the present invention;

FIG. 16 is a diagram explaining an operation of sensor elements according to embodiment 2 of the present invention;

FIG. 17 is a diagram explaining an operation of sensor elements according to embodiment 2 of the present invention;

FIG. 18 is a diagram explaining an operation of sensor elements according to embodiment 2 of the present invention;

FIG. 19 is a diagram explaining an operation of sensor elements according to embodiment 2 of the present invention;

FIG. 20 is a diagram explaining an operation of sensor elements according to embodiment 2 of the present invention;

FIG. 21 is a diagram explaining an operation of sensor elements according to embodiment 2 of the present invention;

FIG. 22 is a diagram explaining an operation of sensor elements according to embodiment 2 of the present invention;

FIG. 23 is a diagram explaining an operation of sensor elements according to embodiment 2 of the present invention;

FIG. 24 is a diagram explaining an operation of sensor elements according to embodiment 3 of the present invention;

FIG. 25 is a diagram explaining an operation of sensor elements according to embodiment 4 of the present invention;

FIG. 27 shows a conventional sensor element and control method thereof; and

FIG. 28 shows a conventional sensor element and control method thereof.

DESCRIPTION OF EMBODIMENTS

Embodiment 1

Figure 1:
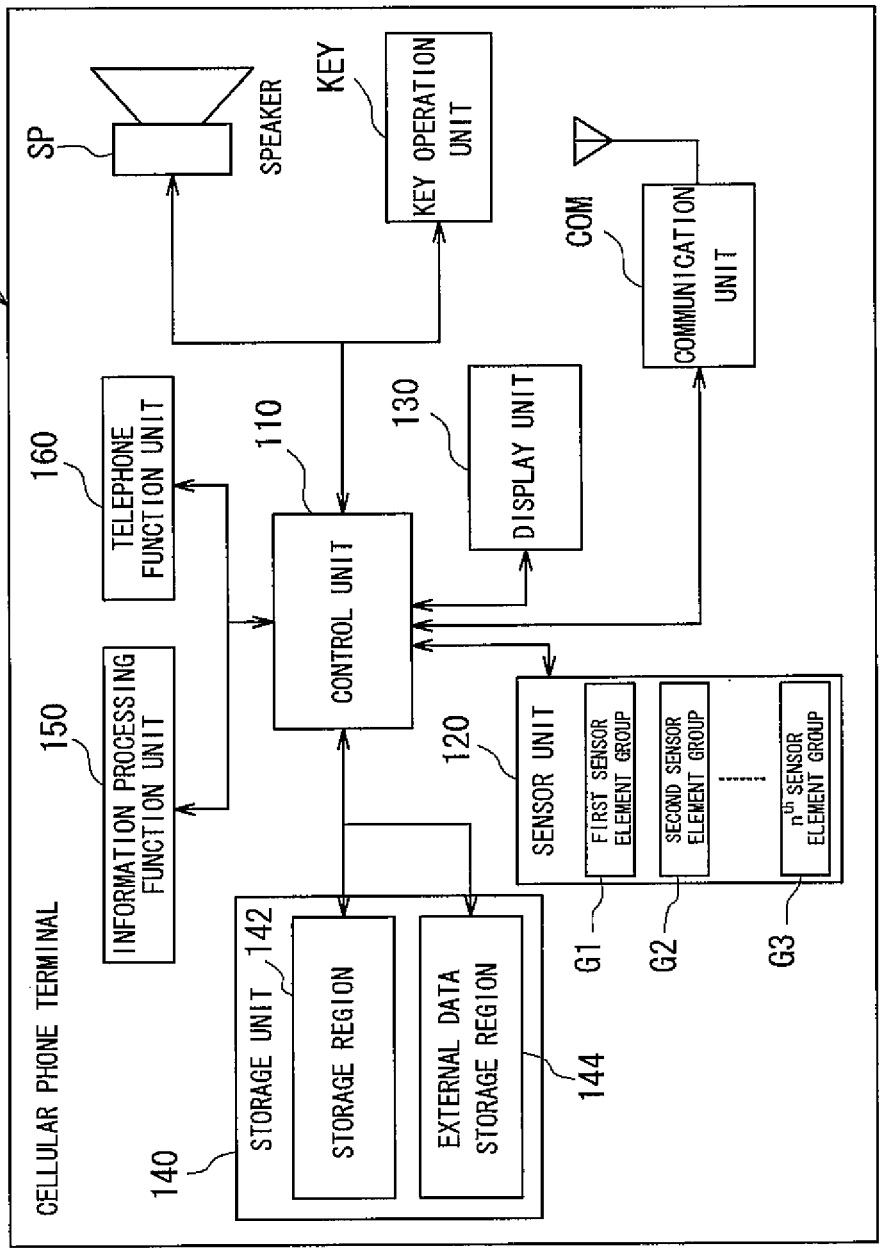
FIG. 1 is a block diagram illustrating a basic design of a cellular phone terminal according to the present invention.

Preferred embodiments of the present invention will now be described with reference to the accompanying drawings. In the following description, the present invention is applied to a cellular phone terminal as a typical example of a portable electronic apparatus. FIG. 1 is a block diagram illustrating a basic design of a cellular phone terminal according to an embodiment of the present invention. As shown, the cellular phone terminal 100 includes a control unit 110, a sensor unit 120, a display unit 130, a storage unit (flash memory or the like) 140, an information processing function unit 150, a telephone function unit 160, a key operation unit KEY, a speaker SP and a communication unit COM for performing communication by being connected to CDMA (Code Division Multiple Access) communication network (not shown). The sensor unit 120 includes n sensor element groups as usage, in other words, a first sensor element group G1, a second sensor element group G2, and an $n^{th}$ sensor element group G3, and the sensor element group has a plurality of sensors (for example, contact sensors having detection portions arranged on a surface of a housing for detecting contact or approach of an object such as a finger or the like). The storage unit 140 has a storage region 142 and an external data storage region 144. The control unit 110 and the information operation function unit 150 preferably have calculation means such as CPU, software module and the like. In addition, a serial interface unit SI described later, an RFID module RFID and an infrared-ray communication unit IF connected to the control unit 110 through the serial interface unit SI, a camera 180, a light 190, a microphone MIC, a radio module RM, a power supply PS, a power supply controller PSCON, etc. are connected to the controller 110, but they are not shown in the drawing for simplification.

Function of each block in the block diagram shown in FIG. 1 will be briefly described. The control unit 110 detects a contact of an object such as user's finger or the like with the sensor unit 120, stores the detected information into the storage region 142 of the storage unit 140, and controls the information processing function unit 150 to process the stored information. The control unit 110 displays information according to a processing result on the display unit 130. The control unit 110 also controls the telephone function unit 160 for ordinary call function, the key operation unit KEY, and the speaker SP. The display unit 130 is configured by including a sub-display unit and a main display unit (display unit which is provided at a position where it is hidden in the closed state of the cellular phone terminal 100, and is exposed in the open state) not shown.

Figure 2:
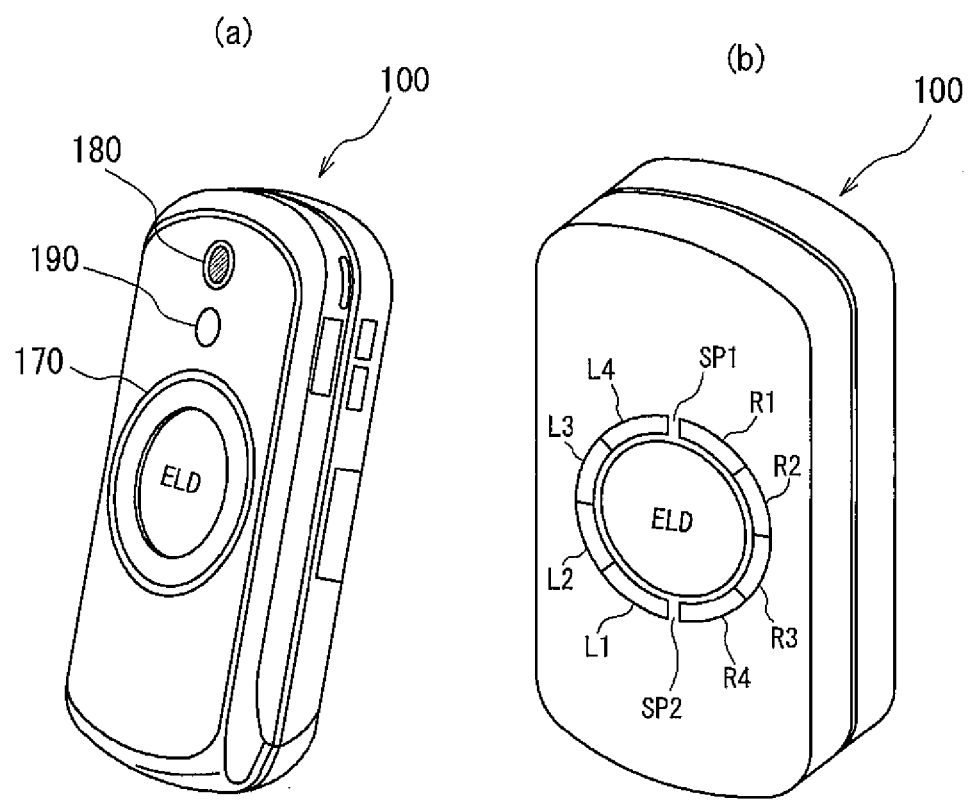
FIG. 2 is a perspective view of the cellular phone terminal having sensor elements mounted on a housing.

FIG. 2 is a perspective view of the cellular phone terminal having sensor elements mounted on a housing. The cellular phone terminal 100 can form an open state by rotating a hinge unit (not shown) or being slid, as well as a closed state as shown in FIG. 2, and a touch sensor unit 170 is provided at a position where it is operable even in the closed state. FIG. 2(a) is a perspective view illustrating an appearance of the cellular phone terminal 100. The cellular phone terminal 100 has the touch sensor unit 170 (in appearance, a panel PNL that covers the sensor element groups G1, G2 and is described later by referring to FIG. 6 is seen), the camera 180, and the light 190. FIG. 2(b) is a perspective view of the cellular phone terminal 100 illustrating only sensor elements and arrangement around the sub-display unit ELD with omitting the panel PNL for describing an operation of the touch sensor. As shown, sensor elements L1~L4 and R1~R4 are arranged around the sub-display unit ELD side by side. Sensor elements L1~L4 and R1~R4 compose a first sensor element group G1 and a second sensor element group G2, respectively. The first sensor element group and the second sensor element group are arranged side by side with separating portions SP1, SP2 between them. With respect to the layout of the first sensor element group G1, the second sensor element group G2 has a layout of line symmetry with respective to the direction in which the selection candidate items are arranged, with the sub-display unit ELD between them. In this embodiment, the sub-display unit ELD uses an organic EL display, but for example, a liquid crystal display or the like may be employed. Moreover, in this embodiment, sensor elements L1~L4 and R1~R4 are capacitance-type contact sensors, but thin-film-resistance-type contact sensors may be employed.

In the cellular phone terminal 100 of FIG. 2, the sub-display unit ELD displays information according to a usage of the cellular phone terminal 100. For example, when the cellular phone terminal is used as a music player, titles of pieces of music that can be played are displayed on the sub-display unit ELD. A set of a music title and artist name forms one item, in other words, "selection candidate item". A user selects a music title with moving items or an operation target region displayed on the sub-display unit ELD by operating the touch sensor unit 170 and changing the capacitance of sensor elements R1~R4 and L1~L4. Arranging touch sensors side by side around the sub-display unit ELD shown in FIG. 2 allows sensor elements to be formed so as not to occupy a mounting portion on the housing of the small cellular phone terminal as well as allows a user to operate sensor elements with seeing the display on the sub-display unit ELD.

Figure 3:
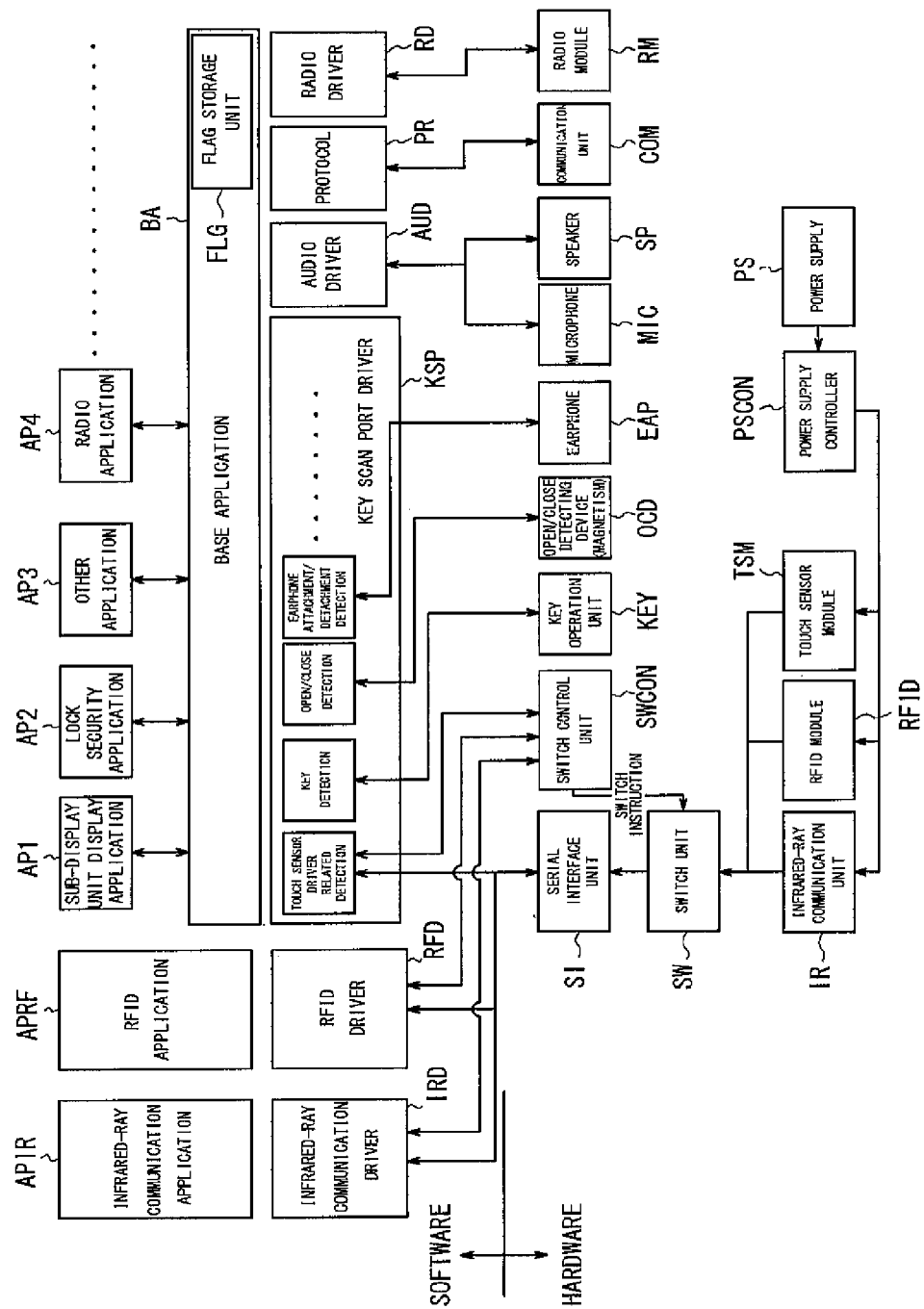
FIG. 3 is a detailed functional block diagram of the cellular phone terminal 100 according to the present invention.

FIG. 3 is a detailed functional block diagram of the cellular phone terminal 100 according to the present invention. Various kinds of software shown in FIG. 3 are executed by the control unit 110 after a work area is provided on the storage unit 140, on the basis of the program stored in the storage unit 140. As shown, each function of the cellular phone terminal 100 is divided into a software block and a hardware block. The software block includes a base application BA having a flag storage unit FLG, a sub-display unit display application AP1, a lock security application AP2, other applications AP3 and a radio application AP4. The software block also includes an infrared-ray communication application APIR and a RFID application APRF. When to these applications control various kinds of hardware of the hardware blocks, an infrared-ray communication driver IRD, an RFID driver RFD, an audio driver AUD, a radio driver RD, and a protocol PR are used as drivers. For example, the audio driver AUD, the radio driver RD, and the protocol PR control the microphone MIC, the speaker SP, the communication unit COM, and the radio module RM, respectively. The software block further includes a key scan port driver KSP for monitoring and detecting operation conditions of the hardware, and performs detections related to a touch sensor driver, key detections, opening/closing detections of the cellular phone terminal of a folded type, slide type or the like, attaching/detaching detections of an ear phone and the like.

The hardware block includes the key operation unit KEY having various buttons such as a dial key or tact switches SW1, SW2 described later, an open/close detecting device OCD for detecting opening/closing based on operation state of the hinge or the like, the microphone MIC attached to the main body, the ear phone EAP which is attachable and detachable, the speaker SP, the communication unit COM, the radio module RM, the serial interface unit SI, and a switch control unit SWCON, and the like. The switch control unit SWCON selects one among the infrared-ray communication unit IR, the RFID module (wireless identification tag) RFID, and a touch sensor module TSM (which is formed as a module of the sensor unit 120 and necessary components on driving the sensor unit 120 such as a vibration circuit or the like), according to a command from a corresponding block in software blocks, and switches the selection target hardware (IR, RFID, TSM) so that the serial interface unit SI picks up the corresponding command. The power supply PS provides power to the selection target hardware (IR, RFID, TSM) through the power supply controller PSCON.

Figure 4:
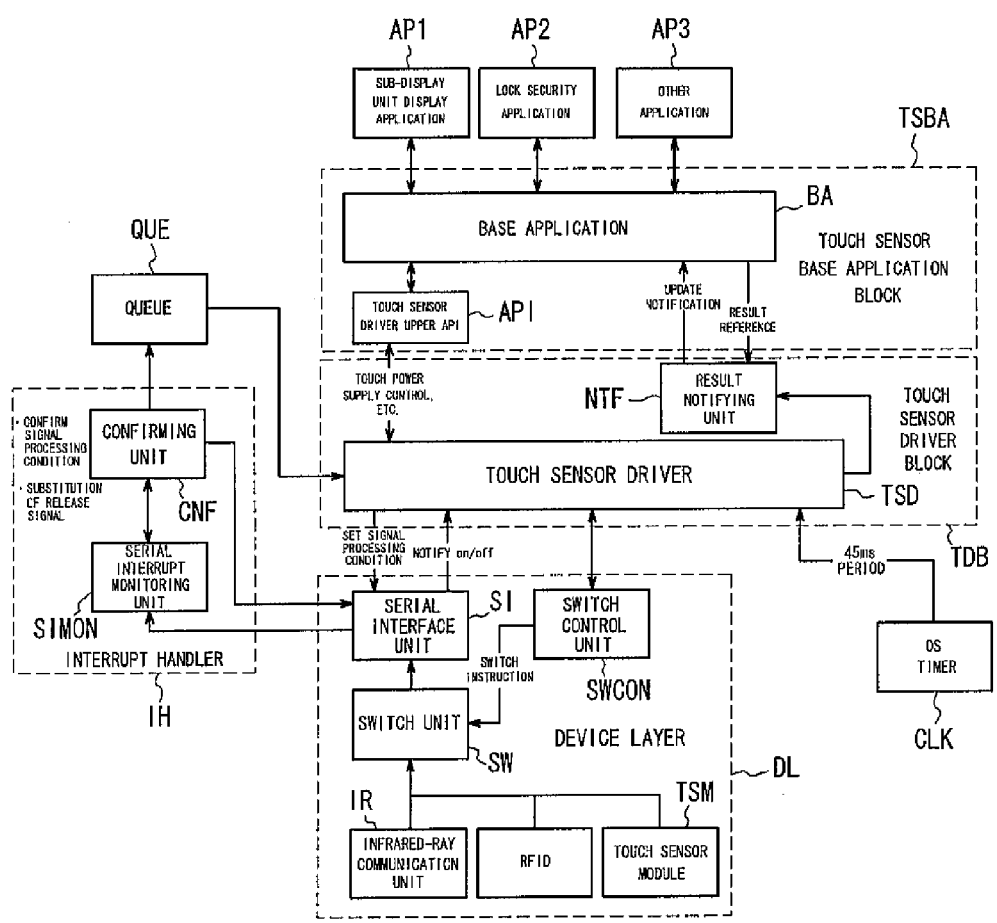
FIG. 4 is a detailed block diagram illustrating touch sensor functions of the cellular phone terminal 100 according to the present invention.

FIG. 4 is a detailed block diagram illustrating touch sensor functions of the cellular phone terminal 100 according to the present invention. As shown, the cellular phone terminal 100 has a touch sensor driver block TDB, a touch sensor base application block TSBA, a device layer DL, an interrupt handler IH, a queue QUE, an OS timer CLK, and various applications AP. The touch sensor base application block TSBA has the base application BA and a touch sensor driver upper application interface API, and the touch sensor driver block TDB has a touch sensor driver TSD and a result notifying unit NTF. The device layer DL has the switch control unit SWCON, a switch unit SW, the serial interface unit SI, the infrared-ray communication unit IR, the RFID and the touch sensor module TSM. The interrupt handler IH has a serial interrupt monitoring unit SIMON and a confirming unit CNF.

Next, function of each block will be described. In the touch sensor base application block TSBA, signals are exchanged between the base application BA and the touch sensor driver upper application interface API to decide whether or not to activate the touch sensor. The base application BA is a base application for the sub-display unit display application AP1 which is an application for the sub-display unit, the lock security application AP2 which is an application for locking the cellular phone terminal 100 for protecting security, and other applications AP3. The base application BA requests the touch sensor driver upper application interface API to activate the touch sensor when there is a request for activation of the touch sensor from above each application. In the cellular phone terminal 100 according to this embodiment, the sub-display unit refers to the sub-display unit ELD, which is surrounded by the sensor elements.

When receiving a request for activation, the touch sensor driver upper application interface API confirms whether the touch sensor can be activated to a block (not shown) that manages activation of applications in the base application BA. Specifically, the touch sensor driver upper application interface API checks whether the sub-display unit ELD is lightened, which indicates that an application is being selected, or whether there is a flag indicating activation of an application for which the touch sensor is previously disabled, such as FM radio and other applications in the cellular phone terminal 100. As the result, when it is determined that the touch sensor can be activated, the touch sensor driver upper application interface API requests activation of the touch sensor module to the touch sensor driver. In other words, the power supply PS actually starts to provide power to the touch sensor module TSM through the power supply controller PSCON.

When there is a request for activation, the touch sensor driver TSD requests the serial interface unit SI in the device layer DL to open a port to the touch sensor driver TSD in the serial interface unit SI.

And then, under the control of the touch sensor driver TSD, signals containing information of a sensing result by the touch sensor (hereinafter, it is referred to as contact signal) are outputted to the serial interface unit SI at the periods of 20 ms according to an internal clock of the touch sensor module TSM.

The contact signal is outputted as a signal having 8 bits corresponding to 8 sensor elements L1~L4 and R1~R4 described above, respectively. Specifically, when each sensor element detects a contact, a "flag:1" for indicating a contact detection is set to a bit corresponding to the sensor element which detects the contact, and a string of these bits forms the contact signal. In other words, the contact signal contains information indicating which sensor elements are contacted or not contacted.

The serial interrupt monitoring unit SIMON in the interrupt handler IH extracts the contact signal outputted to the serial interface unit SI. In here, the confirming unit CNF confirms True/False of the extracted contact signal according to a predetermined condition in the serial interface unit SI, and inserts only TRUE signal into a queue QUE (classification of True/False of a signal will be described later). And, the serial interrupt monitoring unit SIMON monitors other interruptions of the serial interface unit SI during activation of the touch sensor module TSM such as occurrence of pressing a tact switch.

In addition, the monitoring unit SIMON inserts a signal indicating "press" before a contact signal in the queue QUE (queuing), when a detected contact is the first contact. And then, the monitoring unit SIMON updates the contact signal at the periods of 45 ms according to an OS timer CLK in the operation system, and inserts a signal indicating "release" into the queue QUE when a predetermined number of contacts are not detected. In this way, it is possible to monitor a movement of contact detection in sensor elements from the start of contact to the release. The "first contact" means a state that there is no data in the queue QUE, or a phenomenon that a signal having a "flag:1" occurs when the nearest input data is the "release". By these processes, the touch sensor driver TSD can recognize detection states of sensor elements in a period from "press" to "release".

At the same time, when the contact signal which is output from the touch sensor satisfies the condition to be False, the monitoring unit SIMON preliminarily generates a signal indicating "release", and inputs it into the queue QUE. Here, as the conditions to be False, "when a contact is detected by two discontinuous sensor elements", "when an interrupt occurs during activation of the touch sensor (for example, when lighting/lighting-out state of the sub-display unit ELD is changed by notification of the arrival of a mail or the like)", "when push-down of the key occurs during activation of the touch sensor", "contact across a plurality of sensor element groups is detected" as will be described later, or the like is set.

Further, for example, when two adjacent sensor elements such as the sensor elements R2 and R3 detect a contact at the same time, the monitoring unit SIMON inserts the contact signal in which flags are set to the bits corresponding to the elements which detect the contact into the queue QUE as the case that a single element detects a contact.

The touch sensor driver TSD reads out the contact signal from the queue QUE at the periods of 45 ms, and determines the elements that detect a contact based on the read contact signals. The touch sensor driver TSD considers a change of the contact determined by the contact signals which are read in sequence from the queue QUE, and the positional relationship with the detected elements, and determines "a contact start element", "detection of a moving direction (clockwise/counterclockwise) of the contact" and "the number of elements on which the contact moves from press to release (i.e., a moving distance)". The touch sensor driver TSD provides the determined result to the result notifying unit NTF, and notifies the base application BA that the result should be updated.

The moving direction and moving distance of a contact are determined by combination of detection of the adjacent sensor elements and detection of each of the sensor elements, and various methods (determination rules) can be applied to this (details will be described later). For example, when contact transits from a certain sensor element (for example, R2) to the adjacent sensor element (R2 and R3 in the case of this example), this is determined as a movement by an amount of one element (amount of one item on the sub-display unit) in the direction.

As described above, when update of the result is notified to the base application BA by the touch sensor driver TSD, the base application BA confirms the result notifying unit NTF, and notifies the applications which are higher applications and require the touch sensor result (the sub-display unit display application AP1 for menu screen display in the sub-display unit, the lock security application AP2 for lock control, and the like) of the content of the information notified to the result notifying unit NTF.

Figure 5:
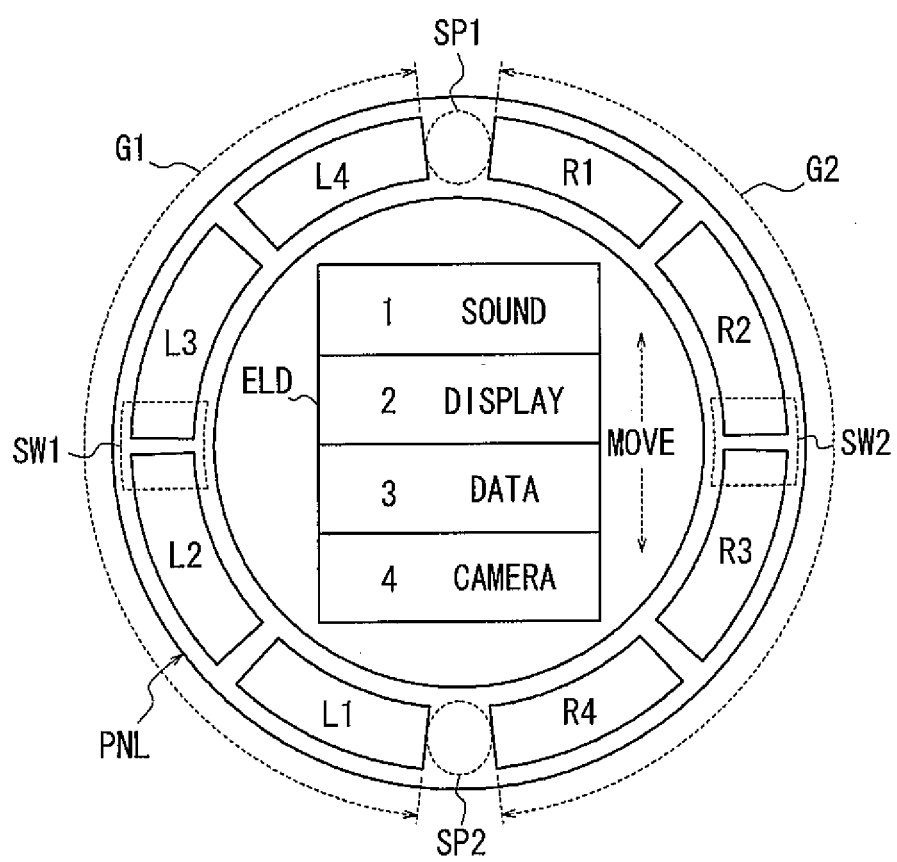
FIG. 5 is a plane view illustrating an arrangement of elements of the cellular phone terminal 100 according to the present invention.

FIG. 5 is a plane view illustrating an arrangement of components especially of the touch sensor unit 170 of the cellular phone terminal 100 according to the present invention. For convenience of creating the drawings and explanation, only some of the components are illustrated and explained. As shown in FIG. 5, the panel PNL of a doughnut shape is placed along the periphery of the sub-display unit ELD constituted of an organic EL device. The panel PNL is preferably thin enough not to affect sensitivity of the sensor elements provided under the panel PNL. Eight capacitance-type sensor elements L1 to L4 and R1 to R4 that can detect a contact/approach of a finger are arranged annularly under the panel PNL. The four sensor elements L1 to L4 at the left side compose the first sensor element group G1, and the four sensor elements R1 to R4 at the right side compose the second sensor element group G2. Between adjacent sensor elements in each sensor element group, a clearance is formed so that a sensor element does not interfere in a contact detection function of an adjacent sensor element. When using sensor elements that do not interfere, these clearances are not needed. A separating portion SP1, which is a larger clearance than the clearance between adjacent sensor elements in the same sensor element group (for example, the length twice as long as or more), is formed between the sensor element L4 placed on one end of the first sensor element group G1 and the sensor element R1 placed on one end of the second sensor element group G2. Similarly to the separating portion SP1, a separating portion SP2 is formed between the sensor element L1 placed on the other end of the first sensor element group G1 and the sensor element R4 placed on the other end of the second sensor element group G2. By these separating portions SP1, SP2, it is possible to prevent a finger from interfering in another one, when the first sensor element group G1 and the second sensor element group G2 operate individually.

Sensor elements of the first sensor element group G1 are arranged in a circular arc shape, and the central portion of the tact switch SW1 is arranged under the center of a line (the arc) connecting centers of sensor elements, in other words, under the middle of sensor elements L2 and L3. In other words, the tact switch SW1 is arranged around the center of a virtual line that connects the center of each sensor elements of the first sensor element group. Similarly, the tact switch SW2 is arranged on the center of a circular arc (virtual line) which connects centers of sensor elements of the second sensor element group G2, in other words, under the middle of sensor elements R2 and R3 (see FIG. 6). Arranging the tact switch around the center of a virtual line (not shown) which connects centers of sensor elements, which is a place not associated with a direction, allows a user to easily recognize that this switch is for operation having no relation directly with an instruction operation for a movement having direction by a finger of the user on the sensor element. If the tact switch is not arranged on the center of the line which connects the sensor element group but arranged on an end portion (for example, L1 or L4), since this switch associates the direction toward the end portion, a user may misunderstand the switch as a "switch" to be pressed long to continue a moving operation by the touch sensor or the like. On the contrary, like this embodiment, when the tact switch is arranged on the center of the line which connects devices of the sensor element group, it is possible to prevent a user from having such a misunderstanding, and to provide more comfortable user interface. Moreover, since the tact switch is arranged under the sensor element and not exposed to the surface of the device, it is possible to reduce the number of operation units exposed to the appearance of the apparatus, and therefore, it is possible to make a smart impression that seems not to require complicated operations. Moreover, when the switch is formed in another location except for the lower part of the panel PNL, it is necessary to form a through hole on the housing of the apparatus, which may lead to reduction of strength of the housing according to a location on which the trough hole is formed. In this embodiment, the tact switch is arranged under the panel PNL and sensor elements, so that it is not necessary to form a new through hole and it is possible to prevent strength of the housing from being reduced.

For example, if a user traces upward sensor elements L1, L2, L3, L4 successively in an arc shape with a finger, an item displayed as a selection target region (i.e., focused region/item, for example, emphasized region with reversed display, another color, or the like) among selection candidate items (in this case, sound, display, data, camera) displayed on the display unit ELD is changed to a upper item successively, or selection candidate items are scrolled upward. When a desired selection candidate item is displayed as the selection target region, the user can select it by pushing the tact switch SW1 through the panel PNL and sensor elements L2, L3, or can change a screen display to another one by pushing the tact switch SW2. In other words, the panel PNL has also a function as a pusher to the tact switches SW1, SW2 by being mounted on the housing with sufficient flexibility for pressing down tact switches SW1, SW2, or to be able to tilt slightly.

FIG. 6 is an exploded perspective view of the touch sensor unit 170 especially in components of the cellular phone terminal shown in FIGS. 2 and 5. As shown, the panel PNL and the sub-display unit ELD are disposed on the first layer that forms an outer face of the housing of the device. Sensor elements L1~L4 and R1~R4 are arranged on the second layer under the panel PNL of the first layer. Tact switches SW1, SW2 are arranged on the third layers under the region between sensor elements L2, L3 of the second layer and under the region between sensor elements R2, R3, respectively.

FIG. 6 shows that the tact switch SW1 is disposed for the center portion to be arranged between sensor elements L2 and L3 as a switch device, and it is also disposed at lower part than the first sensor element group G1 (i.e., than inner side of the housing). For example, while the first sensor element group G1 is operated by contacting the panel PNL on the first sensor element group G1 with a finger, the tact switch SW1 may be formed on the region where the first sensor element group G1 is disposed if the tact switch SW1 can be pressed by pressing the panel PNL, and is not limited to the location described above. In other words, the pressed portion of the tact switch SW1 is not limited to be placed between sensor elements L2 and L3, but it may be arranged anywhere it can be operated with the sensor element group on the panel PNL even if just under each sensor element.

Figure 7:
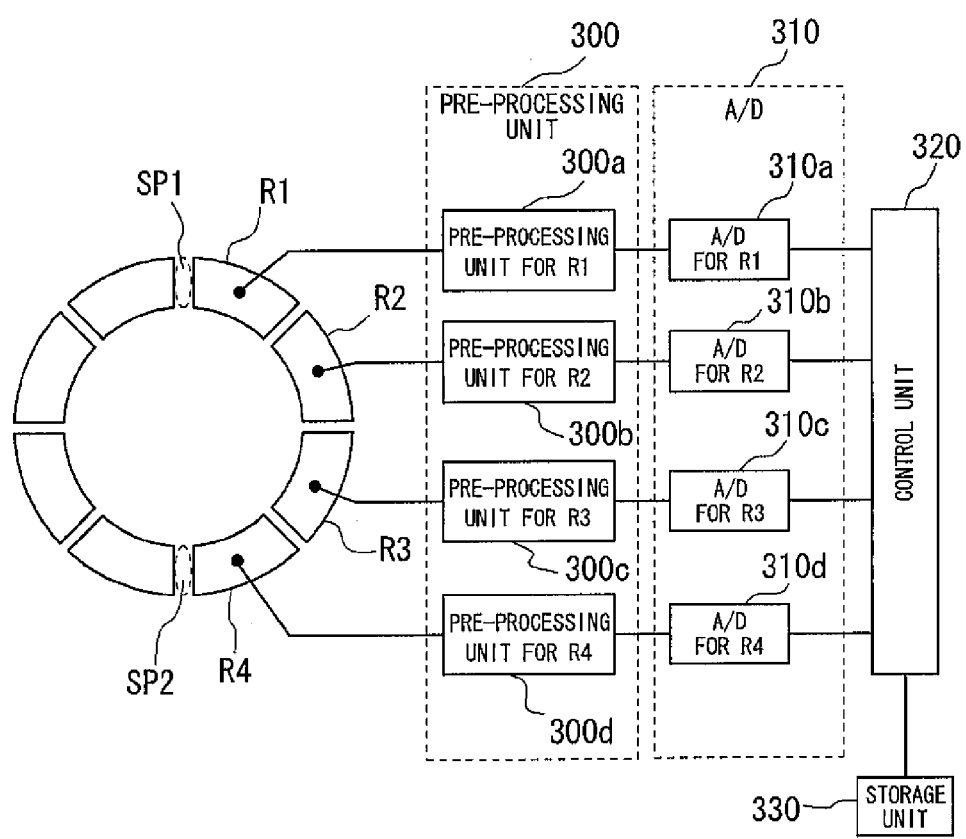
FIG. 7 is a block diagram illustrating a process of contact detection data from each sensor element of the cellular phone terminal according to an embodiment.

FIG. 7 is a block diagram illustrating a process of contact detection data from each sensor element in the cellular phone terminal according to the present invention. For convenience of explanation, the process of data from sensor elements R1~R4 is only illustrated. However, the process is similarly applied to sensor elements L1~L4. High frequency signals are applied to sensor elements R1~R4, respectively. Calibration is performed by considering variation on a stray capacitance, and the high frequency condition at this time is set as a reference. When a pre-processing unit for R1 200*a*, a pre-processing unit for R2 200*b*, a pre-processing unit for R3 200*c* and a pre-processing unit for R4 200*d* included in a pre-processing unit 200 detect variations of the high frequency condition based on changes of capacitance caused by a contact of a finger or the like, the detection signals are sent to an A/D convertor 210 (an A/D convertor for R1 210*a*, an A/D convertor for R2 210*b*, an A/D convertor for R3 210*c* and an A/D convertor for R4 210*d*), and converted to digital signals indicating contact detection.

The digital signals are sent to a control unit 220. The control unit 220 arranges the signals as a signal of the sensor element group, and stores information contained the signal into the storage unit 230. And then, the control unit 220 outputs this signal to the serial interface unit, the interrupt handler. The signal is converted to a signal readable by the touch sensor driver by the interrupt handler, and then inserted into the queue. Moreover, the control unit 220 detects a direction when two or more adjacent sensor elements detect a contact based on information stored in the storage unit 230. FIG. 7 shows an example that the control unit 220 and the storage unit 230 are provided for the sensor element detection, but these may be combined with the control unit 110 and the storage unit 230 shown in FIG. 1, respectively.

Embodiment 1

Figure 9:
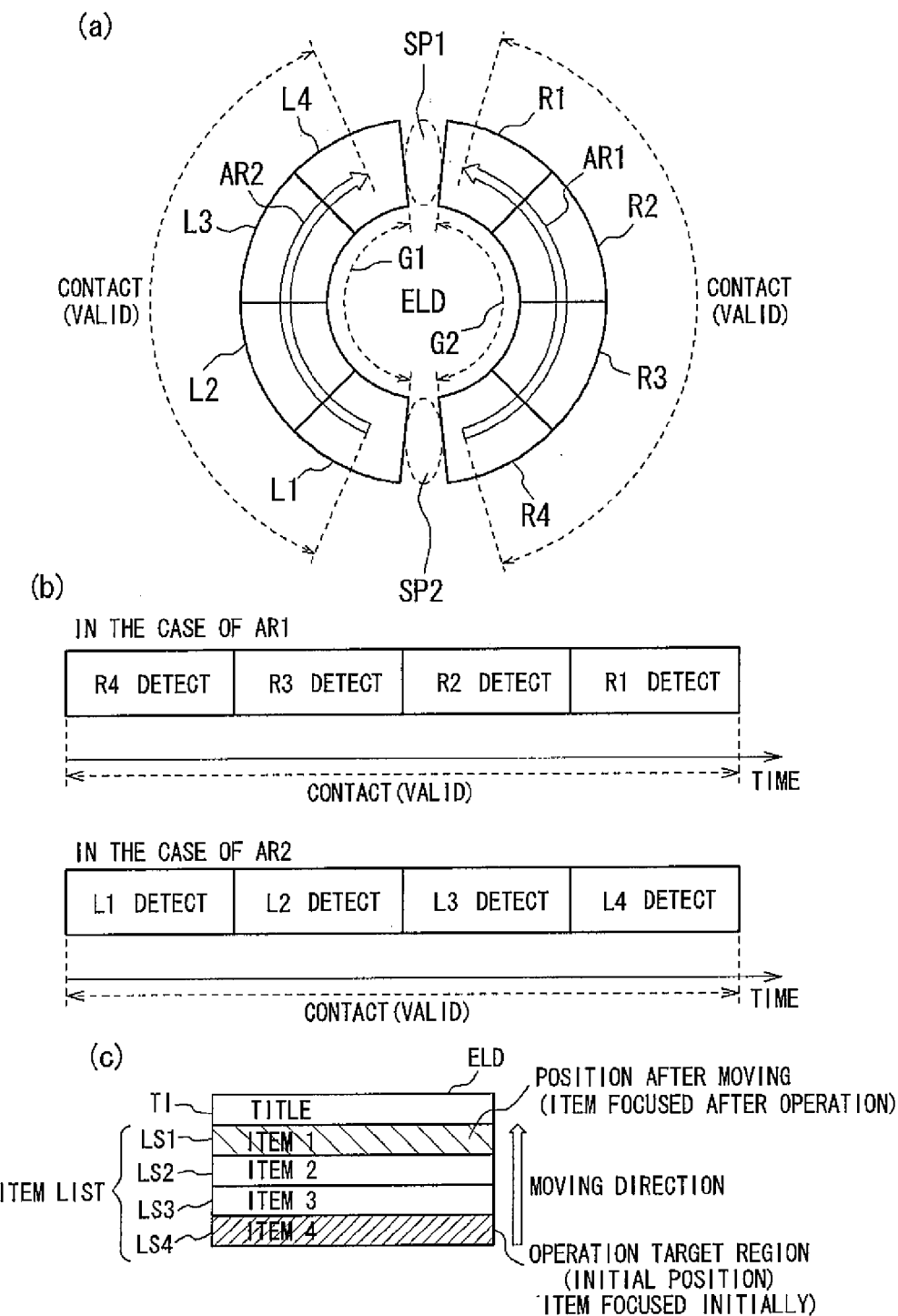
FIG. 9 shows a response of the sub-display unit when a user traces sensor elements.

Below, a response of the display unit when a user operates sensor elements will be described by referring to FIGS. 8~10. In FIGS. 8~10, (a)s are schematic diagrams illustrating only the display unit mounted on the cellular phone terminal and sensor elements arranged around the display unit for brief explanation; (b)s show temporal transitions of sensor elements which detect a contact; and (c)s show changes of position of the operation target region on the sub-display unit ELD according to sensor elements which detect the contact. In these (a)s, the same referential numeral with those of FIG. 2(*b*) are used for sensor elements, sensor element groups and separating portions. In display on the sub-display unit ELD of (c)s, T1 indicates a title of an item list displayed on the display unit, and LS1~LS4 indicate selection candidate items (for example, scrollable several lines). On the sub-display unit of (c), an item that is an operation target is displayed with an emphasized display such as a cursor disposed on the item or a reversed display of the item so as to be discriminated as a current operation target region. In drawings, an item indicated as the operation target region is emphasized by being hatched. For convenience of explanation, "moving target" is explained with only operation target region, but the sub-display unit also operates with a similar method when moving (scrolling) an item itself.

FIG. 8 shows a response of the sub-display unit when a user traces sensor elements. When a user traces sensor elements continually with a contact means, for example a finger or the like, from top to bottom as indicated by an arrow AR1 in (a), the control unit detects a temporal transition of the contact as shown in 8(*b*). In this case, sensor elements R1, R2, R3, R4 detect the contact in order. Since the continuous contact from R1 to R4 is detected by two or more adjacent sensor elements, the control unit detects a direction, and the operation target region moves on the list displayed on the sub-display unit ELD according to the number of transition to adjacent sensor elements and the direction. In this case, as shown in (c), the operation target region moves downward by 3 items from the item LS1 of the initial position to the item LS4. The operation target region is shown by being hatched: one hatched with narrow pitches is the initial position; and the other hatched with wide pitches is the position after movement. In this way, according to this embodiment, since "the operation target region moves downward" on the display unit similarly to the "instruction operation of a finger downward" of a user, the user feels like moving the operation target region freely with his finger. In other words, it is possible to achieve an operation feeling as intended by a user.

Similarly, when sensor elements are traced in a direction indicated by an arrow AR2 in FIG. 8(*a*), sensor elements L4, L3, L2, L1 among sensor elements detect the contact in order as shown in (b). In this case, since the detected contact transits three adjacent sensor elements from top to bottom like the arrow AR1, the operation target region moves downward by three items from the item LS1 to the item LS4 as shown in (c). In this case, since "the operation target region moves downward" on the display unit similarly to the "instruction operation of a finger from top to bottom" of a user, the user can operate sensor elements as his intention by instinct.

FIG. 9 shows a response of the sub-display unit when a user traces sensor elements in the opposite direction to the FIG. 8, in other words from bottom to top. As shown in (a), when sensor elements are traced in a direction indicated by an arrow AR1, sensor elements R4, R3, R2, R1 among sensor elements detect the contact in order as shown in (b). When sensor elements are traced in a direction indicated by an arrow AR2, sensor elements L1, L2, L3, L4 detect the contact in order as shown in (b). In these cases, when the initial position of the operation target region is the item LS4, the operation target region moves upward by three items to the item LS1 as shown in (c).

By such a design, when a user traces sensor elements of each sensor element group from top to bottom with a finger by operating the first sensor element group 122 or by operating the second sensor element group 124, the selection item of the operation selection region on the sub-display unit ELD moves from top to bottom according to the operations. And, when a user traces sensor elements from bottom to top with a finger, the selection item on the sub-display unit ELD also moves from bottom to top. Therefore, a user can do up-and-down operations of a finger corresponding to up-and-down movements of the operation target region with no mistakes, and can moves the operation target region on the sub-display unit ELD upward and downward by instinct.

In this embodiment, the number of sensor elements included in one sensor element group is the same with the number of selection items displayed on the sub-display unit ELD, so that a user can move the operation target region on the sub-display unit ELD from top to bottom (or from bottom to top) through all selection items by tracing one sensor element group as a whole from top to bottom (or from bottom to top), which is one operation. In other words, when a user selects one in the items on the same screen, a user can select the item on the sub-display unit ELD by tracing one sensor element group once with a finger.

By doing like this, when a user traces both sensor element groups continuously by crossing the separating portion SP1 or SP2 with a finger or the like, it is possible to return the operation target region, in other words, to move the operation target region back and forth based on a circulation operation of user's finger.

FIG. 10 shows a response of the sub-display unit when a user contacts the first sensor element group G1 and the second sensor element group G2 continuously by crossing the separating portion SP1. In (a), when a user traces sensor elements continuously from left to right as indicated by an arrow AR, the control unit detects a temporal transition of the contact as shown in (b). In this case, sensor elements L3, L4, R1 detect the contact in order. As shown, the number of sensor elements that detect the contact in the first sensor element group is "two", and that of sensor elements in the second sensor element group is "one". Since the number of sensor elements that detect the contact in the first sensor element group is larger than that of the second sensor element group, the "first contact" detected by the first sensor element group G1 is valid, and the "second contact" detected by the sensor element group G2 is invalid. In other words, a selection item moves on the list displayed on the sub-display unit ELD according to the number of transiting adjacent sensor elements and the direction, and the operation target region moves upward by one item from the item LS2 which is the initial position to the item LS1 as shown in (c).

Figure 11:
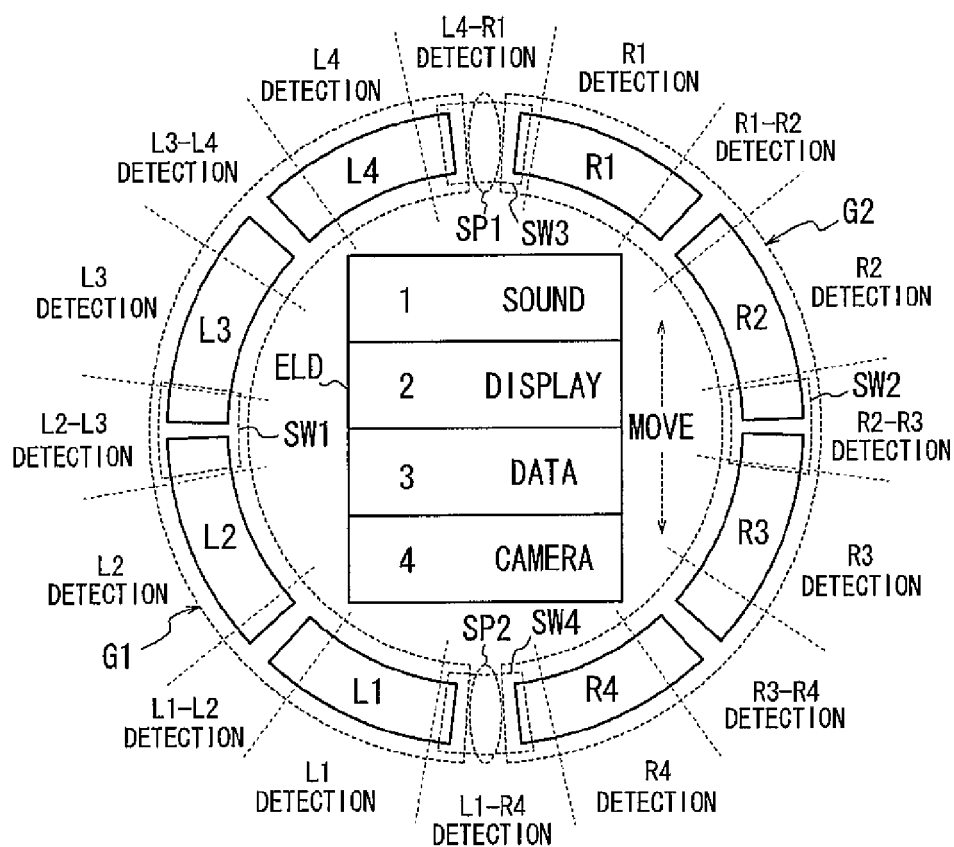
FIG. 11 is a conception diagram illustrating a sensor element region by dividing a detection state of sensor elements into 16 states.

FIG. 11 is a conception diagram illustrating a sensor element region by dividing it into 16 portions so as to determine a plurality of element detection state in which adjacent two device detect a contact, as well as a single element detection state as a sensor element detection state. While this design is almost the same with that of FIG. 5, tact switches are further provided between the first sensor element group G1 and the second sensor element group G2. In other words, a tact switch SW3 is further provided between the sensor element L4 and the sensor element R1, and a tact switch SW4 is further provided between the sensor element R4 and the sensor element L1. If detection states of eight sensor elements are managed one by one, eight detection states can be managed. However, a precise control cannot be performed with eight detection states because the number of states, i.e., the change in states is small. For example, in case of the tact switch SW1 arranged to be extended between sensor elements, sensor elements L2, L3 detect a contact first, when a user presses down the tact switch SW1. Which may be a movement instruction that a user does not intend. Specifically, when a contact is detected by sensor elements L2, L3 in order, it is regarded as a movement instruction upward although it is an operation of pressing down the tact switch SW1 for instructing a decision. Thus, after the operation target region "moves upward by one", the selection operation by pressing down the tact switch SW1 is established, so that there is a fear that an item that a user did not intend is decided or the like.

The design of sensor elements of FIG. 11 is almost same with the design of sensor elements of FIG. 6. However, the sensor elements are designed to detect a contact precisely. For example, when a user contacts only the L1 with a finger or the like, the contact is detected as a contact of L1. However, when a user contacts a boundary region of L1 and L2, the contact is detected as being in a state of contacting "L1 and L2". When the contact moves out L1 completely and proceeds to L2, the contact is detected as a contact of only L1. And then, when a user contacts a boundary region of L2 and L3, the contact is detected as being in a state of contacting "L2 and L3". By employing the method to detect a contact, it is possible to detect 16 detection states despite of using 8 sensor elements.

In order to properly process such pressing operations of tact switches SW1~SW4, there is a method which holds fixing the movement instruction until change in two or three detection states (movement) is detected in 16 detection states. Moreover, it is conceivable to destroy a previous detection state (result) at the time that a press of a tact switch is fixed, which will be described in detail by referring to a flow chart.

Figure 12:
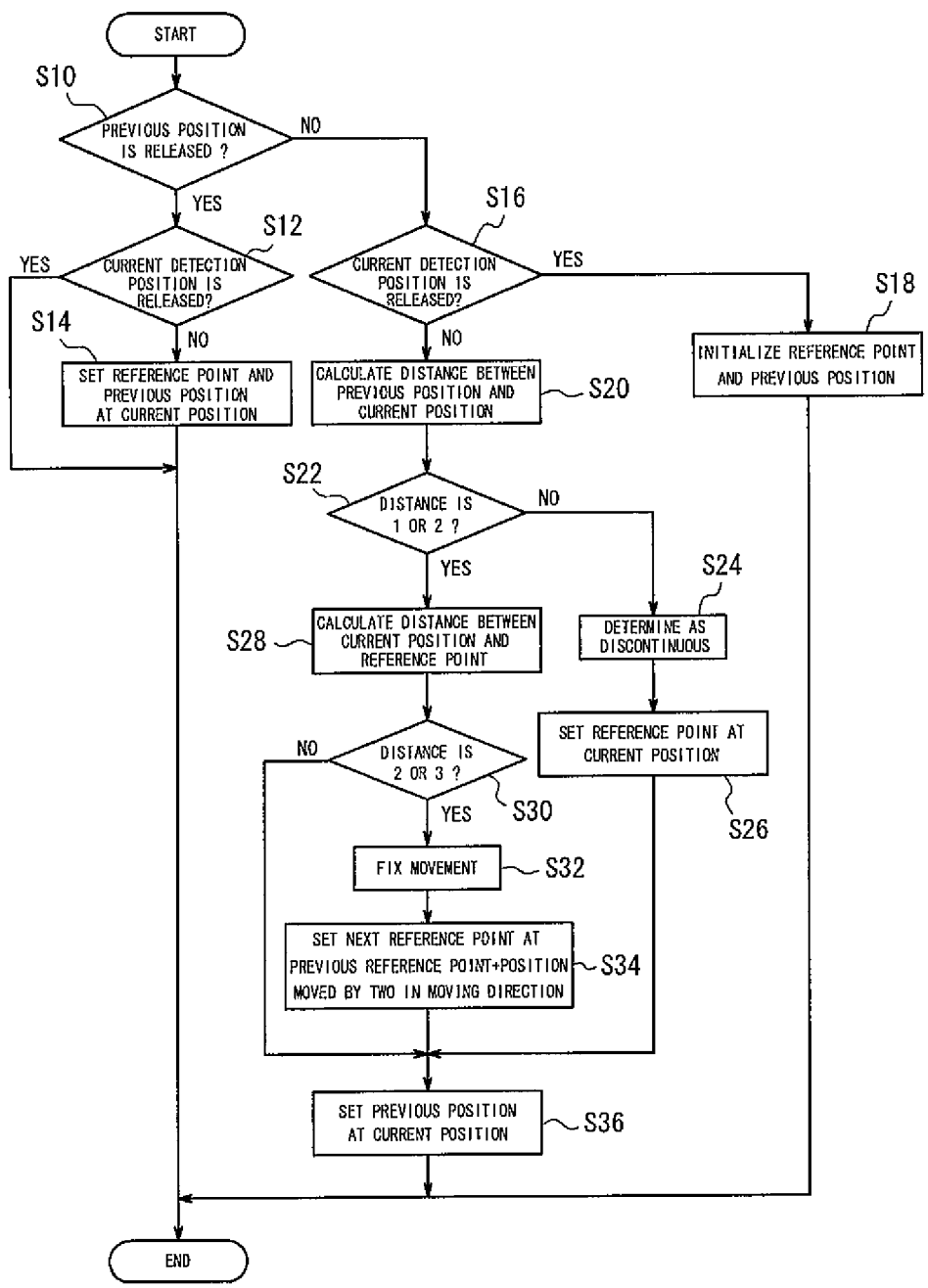
FIG. 12 is a flow chart illustrating one example of movement fixing process (i.e. holding process) in 16 detection states.

FIG. 12 is a flowchart showing on example of movement fixing process (namely, holding processing) in the 16 detection states. The touch sensor driver TSP performs this flowchart processing every time of detecting that a detection state occurs in the queue QUE. The position where the occurrence is first detected from the releases state (any one detection state of 16) is set as the first reference point. From three of the reference point, the current detection position (detection state newly inserted into the queue QUE), the previous detection position (the detection state immediately preceding the current detection state left in the queue QUE), the moving distance (transition of the detection state) is determined. As shown in FIG. 11, in step S10, it is determined whether the previous position is released or not. When it is determined that the previous position is released (the previous data remaining in the queue QUE is "release"), the process proceeds to step S12, and it is determined whether the current detection position is released or not (specifically, whether the data newly inserted is "release" or not). When it is determined that the current detection position is released, the process is finished, whereas when it is determined that it is not released, the process proceeds to step S14, and the reference point and the previous detection position are set at the current detection position.

When it is determined that the previous position is not released in step S10 (specifically, when another detection occurs, and the current detection follows it), the process proceeds to step S16, and it is determined whether the current detection position is released or not (specifically, whether the newly inserted signal is "release" or not). When it is determined that the current detection position is released, the reference point and the previous detection position are initialized (cleared), and the process is finished (step S18). When it is determined that the current detection position is not released in step S16, the distance between the previous detection position and the current detection position is calculated (step S20), and it is determined whether or not the calculated distance is one or two (step S22). When it is determined that the calculated distance is not 1 or 2, it is determined that this is a discontinuous detection state with a sensor element being skipped (step S24), the reference point is set at the current detection position, and the process proceeds to step S36. When it is determined that the distance calculated in step S22 is one or two, the distance between the current detection position and the reference point is calculated (step S28). The touch sensor driver TSD performs the calculation of the distance by determining how many detection states in of 16 detection states is between the previous detection position and the current detection position, since the detection position of each of the sensor elements is known from the signal inserted into the queue QUE.

Further, when the distance calculated in step S28 does not satisfy the condition (specifically, four or more) as a result of determining whether or not it is 2 or 3 (step S30), the process proceeds to step S36 as an error, and when the condition is satisfied (when the distance is two or three), movement is fixed (step S32). More specifically, the first contact position is set as "reference point", and when contact continues to be detected successively without being "released" thereafter, "the previous position" is updated. Finally, "there is a movement" is determined for the first time when "current position" which is the newest detection position "moves by two or three" with respect to the reference point. Further, by continuously detecting the single element detection state and a plurality of element detection state, "movement by two" is determined, and therefore, on the sensor elements, a finger moves by the amount of one sensor element for the first time by the aforementioned "movement by two". The next reference point is set at the position where it moves by two in the moving direction from the previous reference point (step S34), and the process proceeds to step S36. In step S36, "the previous detection position" is set at "the current detection position" for the next processing, and the processing is finished.

When tact switch SW1~SW4 are pressed, the previous detection position and the reference point set at the time are initialized (cleared). Next, a process when tact switches SW1, SW2 of FIG. 11 are pressed down will be described by using the movement fixing process of the flow chart. When the tact switch SW1 is pressed, and detection states are changed from a "L2 detection state" to a "L2-L3 detection state", the movement is not fixed because there is only one transition (movement/change) of the detection state at that time. It is conceivable that when a finger is removed from the tact switch SW1 after pressing down it, detection states are transited from the "L2-L3 detection state" to a "L3 detection state". At this time, if a detection state before the tact switch is pressed is held, since there are two transitions of detection states, "L2 detection state", "L2-L3 detection state" and "L3 detection state" in order, there is a fear that the movement is fixed. However, as described above, since previous detection results are destroyed at the time that press of the tact switch SW1 is detected, it is possible to prevent erroneous detections when a finger is removed. Moreover, releasing the tact switch is not recognized wrongly as a moving instruction of sensor elements.

There is a transition of detection states from the "L2 detection state" to the "L2-L3 detection state" when a finger is removed from the tact switch SW1. Although a detection result before the tact switch SW1 is pressed down is destroyed, it is conceivable that a user contacts a sensor device again when releasing the tact switch. Even in this case, according to the process of the flow chart shown in FIG. 12, since there is only one transition of detection states, there is no fear that releasing the tact switch is recognized wrongly as a moving instruction of sensor elements.

Figure 13:
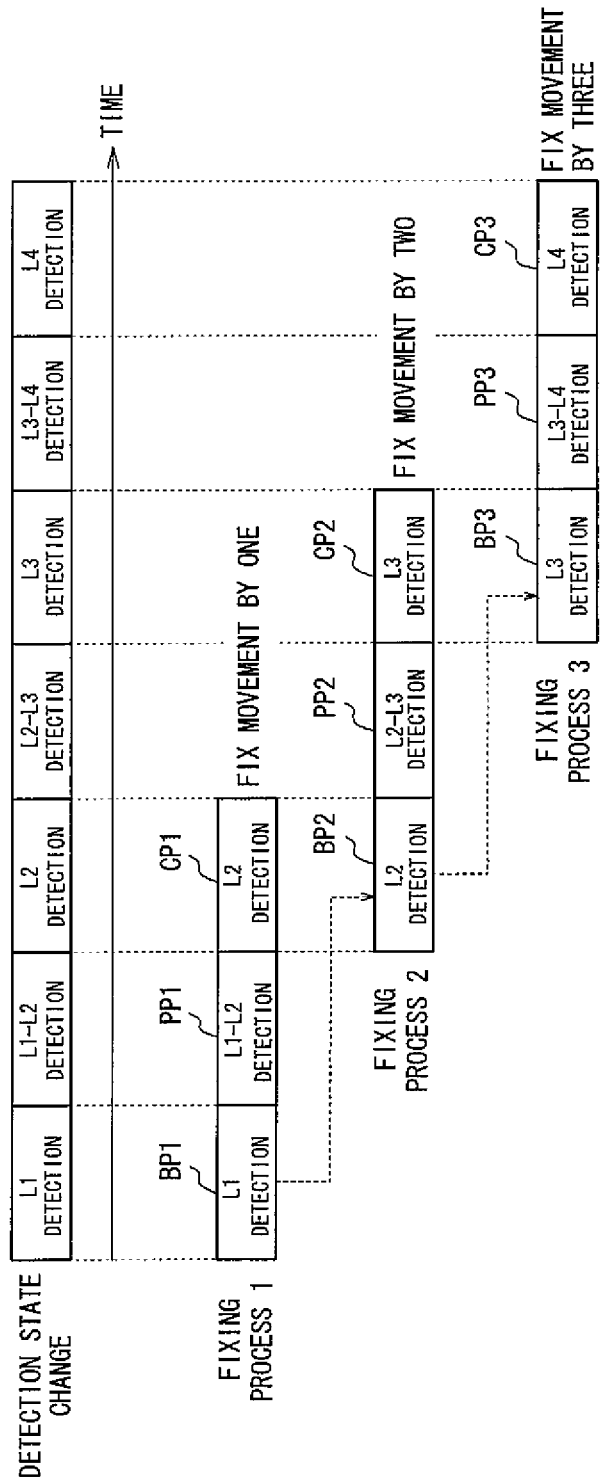
FIG. 13 is a diagram explaining a fixing process when the processing of the flowchart of FIG. 12 is applied to the contact to the sensor elements L1 to L4 of FIG. 11.

FIG. 13 is a diagram explaining a fixing process when the processing of the flowchart of FIG. 12 is applied to a contact to the sensor elements L1 to L4 of FIG. 11. As shown in FIG. 13, change in the detection states is as "L1 detection", "L1-L2 detection", "L2 detection", "L2-L3 detection", "L3 detection", "L3-L4 detection", and "L4 detection". In other words, the single element detection state and the plurality of element detection state are repeatedly detected from L1 to L4. First, the initial "L1 detection" is set at a reference point BP1 (S14). Next, when "L1-L2 detection" occurs, the previous position and the current position detected at this time are compared, because the previous position is not release, but "L1 detection" (S20). Since this is a movement by one frame from L1 to "L1-L2", the movement is regarded valid, and the reference point and the current position are compared this time (S28). Since the reference point and the previous position are similarly set at L1 in this case, the moving amount is also one frame, movement is not fixed at this stage, and the L1-L2 detection state of the current position is set as the previous position PP1 (S36).

Further, when "L2 detection" occurs without occurrence of "release" halfway, the previous position and the current position CP1 which is detected this time are compared because the previous position is "L1-L2 detection" (S29). This is one-frame movement from L1-L2 to L2, and is regarded as valid, since this satisfies the determination condition of "1 or 2?", and the reference point and the current position are compared this time (S28). Since the reference point is similarly set at L1 this time without changing from the time of L1 detection, the positional relationship with L2 is two frames, and therefore, the moving amount is determined as two frames (S30). Movement is fixed for the first time here (S32). Subsequently, for the next determination, a reference point BP2 is set at the point which is transferred by two frames in the moving direction from "L1 detection", that is, "L2 detection" (S34), and the previous position is reset to the current position "L2 detection", whereby fixing process 1 is completed.

Like this, the movement "1" is determined by the touch sensor driver detecting transfer of the detection states of two frames. More specifically, when a movement is fixed in step S32, the component in the moving direction (clockwise direction from L1 to L4) and the movement of "1" are stored in the result notifying unit NTF, update of the stored content is notified to the base application, and the base application extracts the updated content to notify it to the sub-display unit display application AP1 and the like. When the sub-display unit display application AP1 is being used, display of the sub-display unit ELD is changed as the process corresponding to this, because the moving amount of "1" is given in "the direction toward the top from the bottom" on the basis of the component in the moving direction. More specifically, when the list display as shown in FIG. 9(c) is performed, and the operation target region is located at LS4, the operation target region (focused region) moves to LS3 on the basis of the fixing process 1. Incidentally, when the detection state transfers continuously to "R4-R3 detection" and "R3 detection" successively from the state of "R4 detection" for R1 to R4 which is the second sensor element group as in the fixing process 1, the information of "the direction toward the top from the bottom" and addition of the moving amount of "1" is given to the sub-display unit display application AP1 on the basis of the component in the moving direction from the touch sensor via the base application, and on the screen display of the list display, the operation target region changes from the item LS4 to LS3 as the operation in the first sensor element group.

Next, the case in which movement of a finger continues without occurrence of "release" following the fixing process 1 will be described. Similarly to the case of the fixing process 1, as shown in fixing process 2 in FIG. 13, when the detection state proceeds by two frames from a reference point BP2, "L2-L3 detection" is set as the previous position PP2, and "L3 detection" is at the current position CP2, the distance between the reference point BP2 and the current position CP2 becomes two frames, and therefore, a movement "1" is further fixed. More specifically, by the fixing process 1 and the following fixing process 2, a movement of "2" in total is fixed. For the following processing, the reference point is changed with "L3 detection" which is two frames ahead of the reference point BP2 "L2 detection" as a new reference point BP3.

Similarly, as shown in fixing process 3 of FIG. 13, the distance becomes two frames at the point of time when the detection state proceeds by two frames from the reference point BP3, "L3-L4 detection" is set as a previous position CP3, and "L4 detection" is at a current position CP3, a movement "1" is further fixed, and a movement of "three" frames in total with the fixing process 1 and fixing process 2 being combined is fixed. Thus, the movement of "three" in total is notified to the applications.

As the display in the sub-display unit ELD, movement fixing of "1" in "the direction toward the top from the bottom" is notified to the sub-display unit display application AP1 twice following the fixing process 1, and therefore, the operation target region moves upward by "2" from the LS3 to the LS1. Here, the moving amount which is fixed by movement of the state transfer by two frames is set as "1" though the detection state is fragmented so that not only the single element detection state but also a plurality of element detection state is detected, and thereby, movement fixing of "3" at the maximum is performed in the case of the sensor element configured by four sensor elements as in the example as a result. Namely, the moving amount by appearance finally becomes very close to that in the case of performing movement fixing by only the single element detection in the case of four sensor elements, but the moving amount of "3" at the maximum can be ensured even if the user does not accurately touch the surface right on the single element, and the cellular phone terminal can respond to the inaccurate operation of the user in the way corresponding to the desire of the user without being unresponsive. In this way, an item is selected by touch sensors, and when the tact switch is pressed down continuously, an instruction for decision can be provided to running applications such as sub-display unit display application or the like via the base application by the key detection driver, by pressing a contacted portion of the panel of a doughnut shape during operation of the touch sensors, and therefore, a user can operate them with reduced movement of a finger, so that it is to possible to provide a comfortable user interface.

In case of sensor element group composed of "four" sensor elements, an amount of movement fixing is "3" at the maximum since an amount of "1" of a sensor element first contacted is subtracted. Therefore, when displaying selection items with a list on the sub-display unit ELD, the sub-display unit display application program is preferably displays the selection items of "four" lines, which is the same number with the number of sensor elements of "four". By the display control, when a contact is first detected by the sensor element L1 or R4 at the lowest portion (the side of SP1), and continuously detected to the highest portion (the side of SP2), movement fixing of "3" is provided to the sub-display unit display application program, and therefore, the selection target region moves from the lowest part (LS4) to the highest part (LS1). Specifically, since the maximum movement from the lowest portion to the highest portion makes the maximum movement from the lowest part to the highest part on the display, a movement operation on touch sensors corresponds to a movement display on the sub-display unit ELD. Therefore, it is possible to provide a user interface on which a user can easily recognize how to operate.

Further, since the first sensor element group and the second sensor element group are symmetrically arranged with the sub-display unit ELD placed between them, a user can give the same instruction by operating any one. Moreover, since the first sensor element group and the second sensor element group are arranged for their ends to be adjacent each other, for example, when contact detection states are transited from the sensor element L1 in the clockwise direction, and reaches to the detection state of sensor element R4, the display on the sub-display unit ELD is changed as following. Specifically, the operation target region moves from the lowest part LS4 to the highest part LS1 in a period from L1 detection to L4 detection, and continuously, when detection states are transited from R1 detection to R4 detection, the operation returns to the lowest part LS4 from the highest part LS1. Thus, a user can operate in upward and downward directions with a finger when selecting a selection item, and return the target operation region to the first position without removing the finger at all. Therefore, it is possible to provide highly comfortable operation feelings to a user.

There is conceivable the case that when the user carrying the cellular phone terminal performs an operation in the place where vibration easily occurs, his or her finger is instantly off the touch sensor due to external vibration during his or her finger is moving. In such a case, omission of detection hardly occurs in the rough detection method which detects movement by performing only the single element detection that detects only the amount of the number of sensor elements, but when the precise detection method which detects not only the single element detection state but also the plurality of element detection state is adopted, there is conceivable the case in which even when the finger is instantly off, one detection state is omitted because the finger is continuing a rotating operation. However, by adopting "the distance between the previous position and the current position is 1 or 2?" in step S22, when the position is moved by two from the previous position, that is, even when one is omitted from the previous position, the detection state can be dealt as the continuous movement detection state, and therefore, the operation can be brought as close as possible to the operation desired by the user even under vibration.

Since not only the distance of two frames but also that of three frames is made valid in step S30, the moving operation can be detected when it is detected with a finger being instantly off due to vibration, or one detection state being skipped by a quick operation. Further, in detection of the moving amount of three frames, not only the moving amount of "1" is fixed as in the next two frames, but also setting of the reference point for the next detection is performed by moving only two frames with respect to the previous reference point as when moving by two frames. Therefore, even when movement fixing by detecting three frames is performed, the amount of fixing movement by "n−1" that is obtained by subtracting one from the number of sensor elements n can be ensured, and the user can obtain stable operation feeling, which is the same operation feeling no matter how the user may touch the sensor elements.

Embodiment 2

FIG. 14 shows a response of the sub-display unit when a user contacts the first sensor element group G1 and the second sensor element group G2 continuously across the separating portion SP1. In (a), when a user traces two sensor elements continuously from left to right as indicated by an arrow AR, the control unit detects a temporal transition of the contact as shown in (b). In this case, sensor elements L4, R1 detect the contact in order. In the cellular phone terminal 100 according to this embodiment, when sensor elements detect the contact across the separating portion, a movement of the contact is valid in case that contact before and after crossing over the separating portion are detected by two or more sensor elements in each sensor element group G1 or G2. When the contact before and after crossing over the separating portion is detected by only one sensor in the sensor element groups G1 and G2 before and after crossing over the separating portion, the movement of one sensor crossing over the separating portion is regarded as invalid. Accordingly, in this case, since one sensor element L4 in the first sensor element group detects a contact, and then detection of the contact crossing over the separating portion SP1 by adjacent sensor elements in the second group is occurred by only the sensor element R1, the movement from the first contact L4 detected by the first sensor element group G1 to the second contact R1 detected by the second sensor element group G2 is regarded as invalid. Therefore, the operation target region on the sub-display unit ELD does not move as shown in (c).

FIG. 15 also shows a response of the sub-display unit when a user traces sensor elements. In (a), when a user traces sensor elements continuously from bottom to top as indicated by an arrow AR, the control unit detects a temporal transition of the contact as shown in (b). In this case, sensor elements R2, R1 detect the contact in order. Similarly to the case of FIG. 9, since a movement of user's finger or the like on sensor elements does not cross over the separating portion SP1, the movement of contact detections is valid. Accordingly, when the initial position of the operation target region is LS2, the operation target region (focused region) moves upward by one item to the LS1 as shown in (c).

FIG. 16 shows a response of the sub-display unit when a user contacts sensor elements of the first sensor element group G1 and the second sensor element group G2 continuously by crossing over the separating portion SP1 similarly to FIG. 14. In (a), when a user traces sensor elements continuously from right to left as indicated by an arrow AR, the control unit detects a temporal transition of the contact as shown in (b). In this case, sensor elements R1, L4 detect the contact in order. With the similar way to FIG. 14, since the first contact before crossing over the separating portion SP1 is detected by one sensor element R1 in the second sensor element group G2, and the second contact after crossing over the separating portion SP1 is detected by one sensor element L4 in the first sensor element group G1, the movement from R1 to L4 is regarded as invalid. Therefore, the operation target region on the sub-display unit ELD does not move as shown in (c).

FIGS. 17~22 show cases that when a user contacts adjacent three sensor elements continuously, the contact is crossing or not crossing over the separating portion SP1. FIG. 17 shows a response of the sub-display unit when a user traces sensor elements with a finger or the like. In (a), when a user traces sensor elements continuously from bottom to top as indicated by an arrow AR, the control unit detects a temporal transition of the contact as shown in (b). In this case, the contact (detection result) is detected by sensor elements L2, L3, L4 in order. Similarly to the case of FIG. 8, since a movement does not cross over the separating portion SP1, contact detections by L2~L4 is valid. Accordingly, when the initial position of the operation target region is LS3, the operation target region moves upward by two items to the LS1 as shown in (c).

FIG. 18 shows a response of the sub-display unit when a user contacts the first sensor element group G1 and the second sensor element group G2 continuously across the separating portion SP1. In (a), when a user traces sensor elements continuously from left to right as indicated by an arrow AR, the control unit detects a temporal transition of the contact as shown in (b). In this case, sensor elements L3, L4, R1 detect the contact in order. As shown, after two contacts are detected in the first sensor element group, the number of sensor elements that detect the contact crossing over the separating portion SP1 is one in the second sensor element group. Accordingly, the first contact (from L3 to L4) detected by the first sensor element group G1 is valid, while the movement to the second contact (from L4 to R1) detected by the second sensor element group G2 is invalid. Therefore, similarly to the case of FIG. 17, a selection item moves on the list displayed on the sub-display unit ELD according to the number of transition to adjacent sensor elements and the direction. When the initial position of the operation target region is LS2, the operation target region moves upward by one item to the LS1 as shown in (c).

FIG. 19 also shows a response of the sub-display unit when a user traces sensor elements with a finger or the like. In (a), when a user traces sensor elements continuously from left to right as indicated by an arrow AR, the control unit detects a temporal transition of the contact as shown in (b). In this case, the contact (detection result) is detected by sensor elements L4, R1, R2 in order. In this case, since the first contact before crossing over the separating portion SP1 is detected by only one sensor element L4, the movement of contact detections from L4 to R1 crossing over the separating portion SP1 is invalid. However, the movement from R1 to R2 is valid because the contact is detected by two sensors after crossing over the separating portion SP1. Therefore, similarly to the case of FIG. 18, when the initial position of the operation target region is LS2, the operation target region moves downward by one item to the LS3 as shown in (c).

FIG. 20 shows a response of the sub-display unit when a user traces sensor elements with a finger or the like. In (a), when a user traces sensor elements continuously from bottom to top as indicated by an arrow AR, the control unit detects a temporal transition of the contact as shown in (b). In this case, the contact (detection result) is detected by sensor elements R3, R2, R1 in order. Similarly to the case FIG. 17, since the movement does not cross over the separating portion SP1, when the initial position of the operation target region is LS3, the operation target region moves upward by two items to LS1 as shown in (c).

FIG. 21 shows a response of the sub-display unit when a user traces sensor elements with a finger or the like. In (a), when a user traces sensor elements continuously from left to right as indicated by an arrow AR, the control unit detects a temporal transition of the contact as shown in (b). In this case, the contact (detection result) is detected by sensor elements R2, R1, L4. Since the contact is detected by two before crossing over the separating portion SP1, the movement from R2 to R1 is valid. However, the movement from R1 to L4 is invalid since the contact is detected by one after crossing over the separating portion SP1. Therefore, similarly to the case FIG. 18, when the initial position of the operation target region is LS2, the operation target region moves upward by one item to LS1 as shown in (c).

FIG. 22 shows a response of the sub-display unit when a user traces sensor elements with a finger or the like. In (a), when a user traces sensor elements continuously from right to left as indicated by an arrow AR, the control unit detects a temporal transition of the contact as shown in (b). In this case, sensor elements R1, L4, L3 detect the contact in order. Since the first contact before crossing over the separating portion SP1 is detected by only R1, the movement from R1 to L4 is invalid. On the other hand, the movement from L4 to L3 is valid because the contact is detected by two after crossing over the separating portion SP1. Accordingly, similarly to the case FIG. 18, when the initial position of the operation target region is LS2, the operation target region moves downward by one item to LS3 as shown in (c).

While processes when the contact crosses over the separating portion SP1 are described with cases of not crossing over a separating portion, the above description is applied to processes when the contact crosses over the separating portion SP2 similarly.

By doing like this, when a user starts an operation, although a finger does not start exactly on a sensor element at the end portion of one sensor element group, but starts from an adjacent sensor element in sensor elements composing another sensor element group by crossing over the end portion slightly, the contact detection of the sensor element at the start point is regarded as invalid.

Therefore, a user is not required to operate sensor elements exactly with a finger at a start point of operation as well as at an end point of operation, and therefore, convenience of use is highly improved.

FIG. 23 shows a display on the sub-display unit when a user traces sensor elements by one circulation. It will be described about a case that a user starts tracing sensor elements at L1 of the first sensor element group G1, continues to trace L2, L3, L4 in order, then reaches to R1 across the separating portion SP1, continuously traces R2, R3, R4 in order, and finishes tracing sensor elements at the sensor element R4 of the sensor element group G2 with a finger or the like as shown in (a). In this case, the contact is detected with a temporal transition as shown in FIG. 23(b). In other words, the contact is detected by L1, L2, L3, L4, R1, R2, R3, R4, in order. Contact detections from L1 to L4 in the sensor element group G1 are controlled as the case of FIG. 9, and when the initial position of the operation target region is the item LS4, the operation target region moves upward by three items from the item LS4 to the item LS1 as shown in FIG. 23(c). Next, at the point of time when the contact across the separating portion SP1 from the sensor element L4 is detected by the sensor element R1, a control is performed as described by referring to FIG. 14, and since the detection is regarded as invalid, the operation does not move at the item LS1. And then, when the sensor element R2 detects the contact, a control is performed as described by referring to FIG. 19, and since detections from the sensor element R1 to the sensor element R2 are valid, the operation target region moves by one item from the item LS1 to the item LS2. Continuous detections from the sensor element R2 to R4 through R3 are valid since the contact does not cross over the separating portion SP1 or SP2. Consequently, a control superficially similar to the control described in FIG. 8 is performed for contact detections from R1 to R4 in the sensor element group G2. Specifically, as shown in FIG. 23(d), the operation target region located at the item LS1 when the sensor element R1 detects the contact moves downward by three items from LS1 to LS4 when the detection of sensor element reaches to R4 through R2 and R3.

Accordingly, when a user traces the touch sensor unit 170 by one circulation with a finger or the like in this case, an item in the operation target region on the sub-display unit ELD goes back to the first position by going and returning once.

While a case that a user traces sensor elements clockwise according to the arrow AR is described by referring to FIG. 23, when a user traces sensor elements counterclockwise in the opposite direction to the arrow AR, there is a difference only in that the detection order of sensor elements is reversed to the above case, and consequently, the operation target region moves upward from the item LS4 to LS1 by detection from R4 to R1 in the sensor element group G2, and moves downward from LS1 to LS4 by detection from L4 to L1 in the sensor element group G1.

When a user starts tracing sensor elements at R1 of the second sensor element group G2, continues to trace to R2, R3, R4 in order, then reaches to L1 across the separating portion SP2, continuously traces L2, L3 and L4 in order, and finishes tracing sensor elements at the sensor element L4 of the first sensor element group G1 with a finger or the like, the operation target region moves downward by three items from the initial position LS1 to the item LS4 according to contact detections from R1 to R4 in the sensor element group G2, and the operation target region moves upward by three items from the item LS4 to the item LS3 according to contact detections from L1 to L4 in the sensor element group G1.

Further, in the counterclockwise direction, when a user starts tracing sensor elements at L4 of the first sensor element group G1, continues to trace L3, L2, L1 in order, then reaches to R4 across the separating portion SP2, continuously traces R3, R2, R1 in order, and finishes tracing sensor elements at the sensor element R1 of the second sensor element group G2, the operation target region moves downward by three items from the item LS1, which is the initial position, to the item LS4 according to contact detections from L4 to L1 in the sensor element group G1, and moves upward by three items from LS4 to LS1 according to contact detections from R4 to R1 in the sensor element group G2.

Therefore, although a user traces sensor elements in circle without removing a finger, it is possible to make a condition in which the item selected at first is selected when the finger returns to the first position, and therefore, a user does not feel a sense of incongruity.

Embodiment 3

It is described above about cases that there are two sensor element groups. However, there may be three or more sensor element groups. FIG. 24 shows a case that three sensor element groups, a first sensor element group G1 (L1~L3), a second sensor element group G2 (R1~R3) and a third sensor element group G3 (M1~M3), are arranged around the sub-display unit ELD with separating portions SP1~SP3 between them.

It will be described by referring to FIG. 24. In (a), when a user traces sensor elements continuously from left to right as indicated by an arrow AR with a finger, the control unit detects a temporal transition of the contact as shown in (b). In this case, sensor elements L2, L3, R1 detect the contact in order. As shown, since there are two contact detections of sensor elements (from L2 to L3) before the contact crosses over the separating portion SP1, this movement is valid. And, since there is a contact detection by a sensor element (only R1) after the contact crosses over the separating portion SP1, the movement (from L3 to R1) before and after crossing over the separating portion SP1 is invalid. As described by referring to FIG. 18, when the initial position of the operation target region is the item LS4, the operation target region moves upward by one item to the item LS3 in this case as shown in (c). While an example that the display on the sub-display unit ELD is scrolled in upward and downward directions of the screen is provided, the display may be scrolled in right and left directions of the screen as usages.

In this embodiment, the sensor element group G1 and the sensor element group G2 are preferably controlled to move the operation target region on the sub-display unit ELD from top to bottom when a user traces sensor elements from R1 to R3, or from L3 to L1 on each sensor element group with a finger, and are preferably controlled to move the operation target region on the sub-display unit from bottom to top when the user traces sensor elements from R3 to R1 or from L1 to L3 with a finger. And, when the sensor element group G3 is controlled to move the operation target region downward by one and then to return upward by one in both cases a user traces sensor elements from M1 to M3, and traces sensor elements from M3 to M1 with a finger, it is possible to correspond to instinctive operations by a user.

Embodiment 4

FIG. 25 shows a configuration in which sensor element groups having a plurality of sensor elements respectively are arranged in a line. A first, a second, a third sensor element groups G1~G3 are arranged in a straight line with separating portions SP1, SP2 between them. In this case, a sub-display unit (not shown in (a)) is disposed at a proper position such as the top or the bottom of the sensor element groups or the like. It is preferable that selection items displayed on the sub-display unit ELD are arranged in a horizontal direction when sensor elements are arranged in a horizontal direction so that a user can operate sensor elements by instinct (in other words, so that the direction of an instruction operation by a user corresponds to the moving direction on the display unit). In (a), when a user traces sensor elements from left to right as indicated by an arrow AR, the control unit detects a temporal transition of the contact as shown in (b). In this case, sensor elements L3, R1, R2 detect the contact in order. As shown, since there is one detection of a sensor element (only L3) before the contact crosses the separating portion SP1, the movement before and after the contact crosses over the separating portion SP1 (from L3 to R1) is invalid. And, since there are two contact detections of sensor elements (from R1 to R2) after crossing over the separating portion SP1 is valid. As described by referring to FIG. 18, when the initial position of the operation target region is the item LS5, the operation target region moves upward by one item to the item LS4.

While sensor elements are arranged in a horizontal line in the above described embodiment, sensor elements may be arranged in a vertical line corresponding to selection items arranged in a vertical line on the sub-display unit ELD, and may also be arranged on right and left sides or top and bottom sides of the sub-display unit ELD by one line according to required functions, usages, and design.

Further, in embodiments described above, the separating portions SP1 and SP2 are provided between sensor element groups, respectively, but the number of separating portions may be decided properly according to functions and usages of the cellular phone terminal 100. Moreover, only one sensor element group may be provided in a vertical or horizontal line without the separating portion. In this case, processes described above when a contact crosses over the separating portion are not performed.

While the invention has been described with reference to exemplary embodiments and drawings, it will be understood by those skilled in the art that many various modifications and extensions of the above-described technology may be implemented using the teaching of this invention. All such modifications and extensions are intended to be included within the true spirit and scope of the present invention. For example, each member, each means, each step and the like can be rearranged not to be contradictory logically. And, a plurality of unit, steps and the like can be combined or divided. For example, in embodiments described above, a layout of sensor elements provided annularly is described, but sensor element groups can be arranged in a U or V shape symmetrically with a display unit placed between them. In addition, in above embodiments, sensor element groups are arranged on left and right sides of the display unit, but they may be arranged on top and bottom of the display unit. Moreover, above embodiments are described with a cellular phone terminal as an example, but the present invention can be widely applied to portable electronic apparatus such as portable wireless terminal, PDA (personal digital assistant), portable game devices, portable audio player, a portable video player, portable electronic dictionary, portable electronic book viewer or the like. In addition, in embodiments, a capacitance-type contact sensor is used as a sensor element, but a thin-film-resistance-type contact sensor described above, an optical-type sensor that detects a contact by variation of a light receiving amount, a SAW-type sensor that detects a contact by decrement of surface acoustic wave, an electromagnetic-induction-type sensor that detects a contact by generation of induced current may be employed. There are some kinds of contact sensors that need to use an instruction device such as an exclusive pen or the like except for a finger, and the present invention may be applied to a portable electronic apparatus having such a contact sensor.

Figure 26:
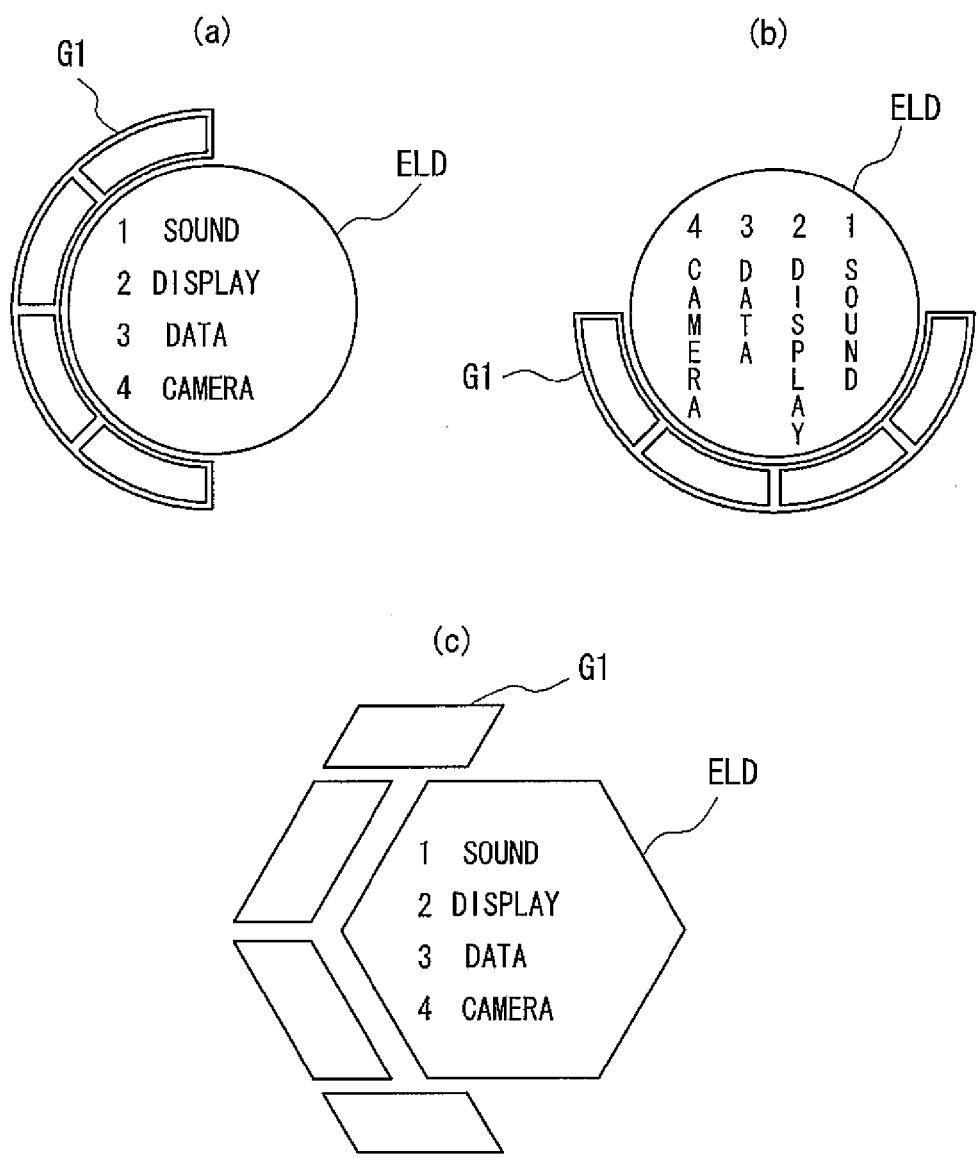
FIG. 26 shows an example of a layout of sensor elements and a sub-display unit according to a variation of the present invention.

Further, in each embodiment, sensor element groups are arranged in an annular shape, and items on the sub-display unit ELD are arranged in a vertical direction. However, they are arranged in various ways according to required functions and design of the cellular phone terminal. For example, as shown in FIG. 26(a), a sensor element group G1 is arranged on only the right or left side of the sub-display unit ELD in a semicircle shape corresponding to an arrangement of display items on the sub-display unit ELD in a vertical direction. Moreover, as shown in (b), the sensor element group G1 may be arranged on top or bottom side of the sub-display unit ELD, or arranged symmetrically on top and bottom sides in a semicircle shape corresponding to an arrangement of display items on the sub-display unit ELD in a horizontal direction. Furthermore, as sown in (c), the outer line of the sub-display unit ELD and the sensor element group G1 may not have an annular shape. The sub-display unit ELD may have a hexagonal shape as shown in (c) according to required functions and design, and the sensor element group G1 may be arranged on a right or left side, or right and left sides symmetrically along the sub-display unit ELD. The sensor element group G1 can be also arranged on a top or bottom side, or top and bottom sides symmetrically along the sub-display unit ELD. The sub-display unit may be formed in a rectangular shape, which is not shown, and the sensor element group G1 may be arranged on a top or bottom side or top and bottom sides symmetrically, or a left or right side or left and right sides symmetrically in a U-shape or V-shape. In these layouts, the numbers of sensor element group G1 and sensor elements composing the sensor element group G1 may be decided properly according to function or design.

Further, while sensor elements are arranged in a circular arc shape in embodiments of the present invention, it is conceivable that the arrangement direction is divided into two orthogonal vectors of a first direction component which corresponds to the arrangement direction of display items, a second direction component which is vertical to the first direction component. Specifically, the movement of a finger may be analyzed as below by dividing the direction into two vector components. For example, when sensor elements are traced from the sensor element L1 to L4 in the clockwise direction (or the counterclockwise direction), the first direction component is toward the top from the bottom (or toward the bottom from the top), and the second direction component goes from right to left in steps of sensor elements L1, L2 and goes from left to right in steps of sensor elements L3, L4. Specifically, as for the first direction component, since the moving direction of a finger and the arrangement direction of display items correspond to each other, the moving direction of the finger in the first direction component and the selection position changing direction of the display items correspond to each other, so that a user can easily recognize selection of a display item by instinct.

Moreover, when the sub-display unit ELD can perform more various displays, display items may be arranged not only in a vertical or horizontal direction, but also in a direction so as to correspond to the arrangement of sensor elements in a circular shape or an annular shape which is not limited to only a circle. In this case, a movement of detection position by sensor elements (in other words, a comprehensive operation of a finger including a moving direction and moving speed or the like of the finger) perfectly corresponds to a movement of a selection position of display items, so that a user can operate more easily by instinct, and therefore, the usability is highly improved.

The invention claimed is:

1. Portable electronic apparatus comprising:
   a display unit;
   a first sensor element group having a plurality of sensor elements for detecting a contact and arranged continuously adjacent to the display unit side by side;
   a switch element formed where the first sensor element group is arranged, wherein the switch element is arranged to overlap a first sensor element and a second sensor element of the plurality of sensor elements; and
   a control unit for monitoring a change in a detection state of the first sensor element group and a state of the switch element,
   wherein, when respectively different processing is assigned to a press of the switch element and a contact of the first sensor element and the second sensor element, the control unit regards a contact detection of the first sensor element and the second sensor element as invalid in a case that the first sensor element and the second sensor element detects the contact when the press of the switch element is detected.

2. The portable electronic apparatus according to claim 1, wherein
   a direction component of an arrangement of the plurality of sensor elements composing the first sensor element group comprises at least a first direction, and
   the control unit controls the display unit to display the plurality of selection candidate items in a parallel direction to the first direction, and to change the selection candidate items and/or the operation target region along the first direction according to a change in a detection state of the first sensor element group.

3. The portable electronic apparatus according to claim 1, wherein the switch element is formed around a central portion of a line connecting centers of the plurality of sensor elements.

4. The portable electronic apparatus according to claim 1, wherein the control unit regards a press of the switch element as valid when one of the selection candidate items is displayed as the operation target region, otherwise it regards the press of the switch element as invalid.

5. The portable electronic apparatus according to claim 1, further comprising a second sensor element group having a plurality of sensor elements arranged symmetrically to the first sensor element group, wherein the display unit is placed between them.

6. The portable electronic apparatus according to claim 1, wherein the control unit allows the display unit to display a plurality of selection candidate items that can be displayed as an operation target region on the display unit, changes a selection state of a selection candidate item by changing the selection candidate items and/or the operation target region based on the change in the detection state of the first sensor element group, and executes a selection candidate item in the selection state when the switch element is pressed.

7. A control method of a portable electronic apparatus comprising a display unit, a first sensor element group having a plurality of sensor elements for detecting a contact and arranged continuously adjacent to the display unit side by side, and a switch element formed where the first sensor element group is arranged, wherein the switch element is arranged to overlap a first sensor element and a second sensor element of the plurality of sensor elements, comprising:
   monitoring a change in a detection state of the first sensor element group and a state of the switch element; and
   regarding a contact detection of the first sensor element and the second sensor element as invalid, when respectively different processing is assigned to a press of the switch element and a contact of the first sensor element and the second sensor element, in a case that the first sensor element and the second sensor element detects the contact when the press of the switch element is detected.

* * * * *